US012353887B2

(12) United States Patent
Nagarajan et al.

(10) Patent No.: US 12,353,887 B2
(45) Date of Patent: Jul. 8, 2025

(54) PROGRAMMABLE ACCELERATOR FOR DATA-DEPENDENT, IRREGULAR OPERATIONS

(71) Applicant: Google LLC, Mountain View, CA (US)

(72) Inventors: Rahul Nagarajan, San Jose, CA (US); Suvinay Subramanian, Sunnyvale, CA (US); Arpith Chacko Jacob, Los Altos, CA (US); Christopher Leary, Sunnyvale, CA (US); Thomas James Norrie, San Jose, CA (US); Thejasvi Magudilu Vijayaraj, Santa Clara, CA (US); Hema Hariharan, Cupertino, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 17/981,617

(22) Filed: Nov. 7, 2022

(65) Prior Publication Data

US 2023/0153116 A1   May 18, 2023

Related U.S. Application Data

(60) Provisional application No. 63/357,281, filed on Jun. 30, 2022, provisional application No. 63/322,285, (Continued)

(51) Int. Cl.
*G06F 9/38* (2018.01)
*G06F 9/30* (2018.01)
*G06N 3/02* (2006.01)

(52) U.S. Cl.
CPC ........ *G06F 9/3895* (2013.01); *G06F 9/30036* (2013.01); *G06F 9/3851* (2013.01);
(Continued)

(58) Field of Classification Search
None
See application file for complete search history.

(56) References Cited

U.S. PATENT DOCUMENTS 5,418,973 A * 5/1995 Ellis ..................... G06F 9/30036
711/3
6,704,860 B1   3/2004 Moore
(Continued)

FOREIGN PATENT DOCUMENTS

JP   2018521427 A   8/2018
JP   2021177366 A   11/2021
(Continued)

OTHER PUBLICATIONS

International Search Report and Written Opinion for International Application No. PCT/US2022/048357 dated Feb. 22, 2023. 16 pages.
(Continued)

*Primary Examiner* — Michael Sun
(74) *Attorney, Agent, or Firm* — Lerner David LLP

(57) ABSTRACT

Aspects of the disclosure provide for an accelerator capable of accelerating data dependent, irregular, and/or memory-bound operations. An accelerator as described herein includes a programmable engine for efficiently executing computations on-chip that are dynamic, irregular, and/or memory-bound, in conjunction with a co-processor configured to accelerate operations that are predictable in computational load and behavior on the co-processor during design and fabrication.

26 Claims, 15 Drawing Sheets

Related U.S. Application Data filed on Mar. 22, 2022, provisional application No. 63/281,960, filed on Nov. 22, 2021, provisional application No. 63/279,262, filed on Nov. 15, 2021.

(52) U.S. Cl.
CPC .......... *G06F 9/3887* (2013.01); *G06F 9/3888* (2023.08); *G06N 3/02* (2013.01)

(56) References Cited

U.S. PATENT DOCUMENTS

| | | |
|---|---|---|
| 7,206,922 B1 | 4/2007 | Steiss |
| 7,248,266 B2 | 7/2007 | Tuomi |
| 7,249,202 B2 | 7/2007 | Simon et al. |
| 7,461,210 B1 | 12/2008 | Wentzlaff et al. |
| 7,613,886 B2 * | 11/2009 | Yamazaki ............. G06F 15/167 711/149 |
| 7,636,835 B1 | 12/2009 | Ramey et al. |
| 7,917,701 B2 * | 3/2011 | Charra ................. G06F 9/3832 711/137 |
| 9,086,872 B2 | 7/2015 | Hargil et al. |
| 9,323,672 B2 | 4/2016 | Kim et al. |
| 9,628,146 B2 | 4/2017 | Van Nieuwenhuyze et al. |
| 9,851,917 B2 | 12/2017 | Park et al. |
| 11,113,233 B1 | 9/2021 | Volpe |
| 11,182,110 B1 | 11/2021 | Ansari et al. |
| 11,210,760 B2 | 12/2021 | Nurvitadhi et al. |
| 11,340,792 B2 | 5/2022 | Danilov et al. |
| 2004/0133765 A1 | 7/2004 | Tanaka et al. |
| 2007/0198901 A1 | 8/2007 | Ramchandran et al. |
| 2012/0159130 A1 * | 6/2012 | Smelyanskiy ...... G06F 9/30043 712/216 |
| 2012/0303932 A1 | 11/2012 | Farabet et al. |
| 2013/0151482 A1 | 6/2013 | Tofano |
| 2015/0074374 A1 * | 3/2015 | Zhang .................. G06F 9/3871 712/7 |
| 2017/0004089 A1 | 1/2017 | Clemons et al. |
| 2017/0351516 A1 | 12/2017 | Mekkat et al. |
| 2018/0067899 A1 | 3/2018 | Rub |
| 2018/0081690 A1 * | 3/2018 | Krishna ................ G06F 9/3806 |
| 2018/0109449 A1 | 4/2018 | Sebexen et al. |
| 2018/0217836 A1 * | 8/2018 | Johnson .................... G06F 9/28 |
| 2018/0285233 A1 | 10/2018 | Norrie et al. |
| 2018/0322387 A1 | 11/2018 | Sridharan et al. |
| 2019/0004814 A1 | 1/2019 | Chen et al. |
| 2019/0050717 A1 | 2/2019 | Temam et al. |
| 2019/0121784 A1 | 4/2019 | Wilkinson et al. |
| 2019/0303311 A1 | 10/2019 | Bilski et al. |
| 2019/0340722 A1 | 11/2019 | Aas et al. |
| 2020/0120154 A1 | 4/2020 | Ren et al. |
| 2020/0183738 A1 | 6/2020 | Champigny |
| 2020/0192742 A1 | 6/2020 | Boettcher et al. |
| 2020/0293488 A1 * | 9/2020 | Ray ..................... G06F 9/30163 |
| 2020/0310797 A1 | 10/2020 | Corbal et al. |
| 2021/0081691 A1 | 3/2021 | Chen et al. |
| 2021/0109761 A1 | 4/2021 | Wang et al. |
| 2021/0194793 A1 | 6/2021 | Huse |
| 2021/0303481 A1 | 9/2021 | Ray et al. |
| 2021/0326067 A1 | 10/2021 | Li |
| 2022/0012060 A1 | 1/2022 | Fok et al. |
| 2022/0188600 A1 * | 6/2022 | Li ......................... G06F 7/5443 |
| 2023/0229524 A1 | 7/2023 | Dearth et al. |

FOREIGN PATENT DOCUMENTS

| | | |
|---|---|---|
| JP | 2021532430 A | 11/2021 |
| JP | 2022548114 A | 11/2022 |
| WO | 9707451 A2 | 2/1997 |
| WO | 2006106342 A2 | 10/2006 |

OTHER PUBLICATIONS

International Search Report and Written Opinion for International Application No. PCT/US2022/048919 dated Feb. 22, 2023. 16 pages.

Fang et al. Active Memory Operations. Proceedings of the International Conference on Supercomputing—Proceedings of ICS07: 21ST ACM International Conference on Supercomputing 2007 Association for Computing Machinery US, ACM, 2 Penn Plaza, Suite 701 New York, NY 10121-0701 USA, Jun. 17, 2007 (Jun. 17, 2007), pp. 232-241, DOI: 10.1145/1274971.1275004.

International Search Report and Written Opinion for International Application No. PCT/US2022/033710 dated Dec. 19, 2022. 17 pages.

Batcher odd-even mergesort, From Wikipedia, the free encyclopedia, retrieved from the Internet on Nov. 19, 2021 <https://en.wikipedia.org/wiki/Batcher_odd%E2%80%93even_mergesort>, 2 pages.

Chhugan et al., "Efficient Implementation of Sorting on Multi-Core SIMD CPU Architecture", PVLDB '08, Aug. 23-28, 2008, Auckland, New Zealand, 12 pages.

Chole et al. SparseCore: An Accelerator for Structurally Sparse CNNs. 2018. 3 pages. Retrieved from the Internet: <https://mlsys.org/Conferences/doc/2018/72.pdf>.

Yavits et al., "Sparse Matrix Multiplication on an Associative Processor", retrieved from the Internet on Nov. 19, 2021 <https://arxiv.org/ftp/arxiv/papers/1705/1705.07282.pdf>, 10 pages.

Deb, D., et al., COPE: Reducing Cache Pollution and Network Contention by Inter-tile Coordinated Prefetching in NoC-based MPSoCs, 2020, ACM. pp. 17:1-17:31. (Year: 2020).

International Search Report and Written Opinion for International Application No. PCT/US2022/049353 dated Feb. 6, 2023. 17 pages.

Prabhakar et al. Plasticine: A Reconfigurable Architecture For Parallel Patterns. Proceedings of the 44th Annual International Symposium on Computer Architecture, ISCA ' 17, ACM Press, New York, New York, USA, Jun. 24, 2017 (Jun. 24, 2017), pp. 389-402.

Deb, D. et al., ECAP: energy-efficient caching for prefetch blocks in tiled chip multiprocessor, 2019, The Institution of Engineering and Technology, pp. 417-428. (Year: 2019).

Gaye et al. An Analysis of the Hot Spot Contention and Message Combining on the SSS-MIN. May 25, 1994. D-I vol. J77-D-I, No. 5, pp. 354-363.

Notice of Grant for Japanese Patent Application No. 2023-571623 dated Feb. 4, 2025. 3 pages.

Notice of Grant for Japanese Patent Application No. 2023-572877 dated Feb. 4, 2025. 3 pages.

Paul, S. et al., Dynamic task allocation and scheduling with contention-awareness for Network-on-Chip based multicore systems, Jan. 2021, Elsevier, 16 pages. (Year: 2021).

Yang, L. et al., Optimal Application Mapping and Scheduling for Network-on-Chips with Computation in STT-RAM Based Router. 2019, IEEE, pp. 1174-1189. (Year: 2019).

Office Action for Japanese Patent Application No. 2023-570416 dated Jan. 7, 2025. 6 pages.

Notice of Grant for Japanese Patent Application No. 2023-570416 dated May 27, 2025. 3 pages.

\* cited by examiner

PROGRAMMABLE ACCELERATOR FOR DATA-DEPENDENT, IRREGULAR OPERATIONS

CROSS-REFERENCE TO RELATED APPLICATIONS

The present application claims the benefit of the filing dates of U.S. Provisional Patent Application Nos. 63/357,281 filed Jun. 30, 2022, 63/322,285 filed Mar. 22, 2022, 63/281,960 filed Nov. 22, 2021, and 63/279,262 filed Nov. 15, 2021, the disclosures of which are hereby incorporated herein by reference. The present application is related to U.S. patent application Ser. No. 17/972,681 filed Oct. 25, 2022, Ser. No. 17/972,663 filed Oct. 25, 2022, and Ser. No. 17/722,782 filed Apr. 18, 2022, the disclosures of which are hereby incorporated herein by reference.

BACKGROUND

Hardware acceleration is the use of computer hardware to perform certain types of operations more efficiently. Example types of operations that may be accelerated include linear algebra operations, for example matrix to matrix or matrix to vector multiplication. Devices or processors built to perform hardware-accelerated operations may be referred to as accelerators.

Accelerators are designed and fabricated to accelerate a small subset of desired operations. During the design and fabrication process of an accelerator, assumptions are made as to the nature of the operations desired to be accelerated, such as the size and type of inputs the accelerator receives, the regularity at which inputs are received by the accelerator, or the computational requirements to perform the operations. As a result, accelerators are often highly specialized and may only accelerate a small class of predetermined operations, being unable to execute other operations efficiently, if at all.

Operations outside of this class include data-dependent operations whose computational load on the accelerator cannot be determined before the operations are executed. Multiple instances of accelerating operations of this kind can vary depending on a variety of factors, making a predetermined accelerator design inefficient for accelerating at least some of these instances. Other kinds of operations that are difficult to accelerate include memory-bound operations, in which there is low operational intensity and limited reuse of data. Yet another kind of operation that is difficult to accelerate is irregular operations, which may be characterized by random memory accesses, complex code patterns, and varying use of parallel execution of multiple sub-operations at once.

In practice, processing pipelines such as for training or deploying a machine learning model involve performing a variety of different kinds of operations. Incorporating accelerators in a pipeline for accelerating only some kinds of operations and relying on devices without hardware acceleration to perform other kinds of operations imposes unacceptable delay and memory bandwidth stress on the links and interconnects between accelerators and non-accelerators, limiting performance overall. Designing and fabricating accelerators to cover all types of operations is impossible or infeasible in most cases. Data-dependent operations are not conducive to acceleration and the logistical effort to accelerate other types of operations may not be worth the investment in designing, fabricating, and deploying corresponding accelerators.

BRIEF SUMMARY

Aspects of the disclosure provide for an accelerator capable of accelerating data-dependent, irregular, and/or memory-bound operations. An accelerator as described herein includes a programmable engine for efficiently executing computations on-chip that are dynamic, irregular, and/or memory-bound, in conjunction with a co-processor configured to accelerate operations that are predictable in computational load and behavior on the co-processor during design and fabrication.

Dynamic operations are operations in which the computations performed are data- or input-dependent, meaning that the input is not known before executing the operations. Irregularity in operations can arise from random memory accesses, complex code patterns, and varying amounts of computational resources and parallelism required to perform different instances of the operations for different input data. Memory-bound operations are often operations with low operational intensity, e.g., a lower number of operations performed per unit of data transferred during acceleration of the operations, and with limited reuse of data.

An accelerator as described herein can orchestrate and distribute cross-chip data scatter and gather operations of different sizes of data to scale acceleration on a host device or datacenter implementing multiple accelerators and other processors. As described herein, the accelerator leverages composable architectural primitives for adapting to the acceleration of different types of data-dependent, irregular, and/or memory-bound operations, without requiring physical redesign or alterations to the hardware circuit implementing the accelerator itself.

Aspects of the disclosure provide for an accelerator that can accelerate the computation of neural network layers exhibiting sparsity, e.g., in the form of embeddings. Sparse computation refers to computation in which a fraction of the values of the data computed, e.g., input, output, or intermediate, is zero. The fraction can vary, for example between 0.1% to 50%. Aspects of the disclosure provide for accelerating the training and processing of embeddings as part of a machine learning processing pipeline.

An aspect of the disclosure provides for a processor. The processor includes a plurality of tiles, where each of the plurality of tiles includes a vector core and a slice of a shared software-controlled scratchpad memory. The processor further includes a scalar core configured to dispatch tasks to the plurality of tiles. The processor also includes a memory coupled to the plurality of tiles and the scalar core.

In an example, each tile is configured to execute independent computations. In another example, the vector core in each of the plurality of tiles includes a plurality of single instruction, multiple data (SIMD) processing lanes. In yet another example, multiple tiles of the plurality of tiles issue memory requests in parallel to the main memory.

In yet another example, the vector core in each of the plurality of tiles is configured to generate data-dependent address streams to any level of memory hierarchy. In yet another example, each data-dependent address stream corresponds to a sequence of addresses, where length and specific values of the addresses in the sequence are data-dependent and known only at runtime. In yet another example, the vector core in each of the plurality of tiles is configured to express the data-dependent address streams while decoupling performant servicing of the data-dependent address streams to microarchitecture. In yet another example, the microarchitecture comprises a scatter-gather engine for the performant servicing of the data-dependent address streams. In yet another example, the data-dependent address streams include indirect memory access with multiple addressing modes, runtime-configurable transfer size, and atomic arithmetic updates.

In yet another example, the vector core in each of the plurality of tiles includes circular buffer instructions that enable transfer and access of dynamically sized data streams on statically sized regions of memory. In yet another example, the processor further includes microarchitecture configured to track a runtime buffer size of the dynamically sized data streams. In yet another example, the vector core in each of the plurality of tiles is configured to provide runtime-configuring and accessing regions of tile-local scratchpad memory as in-order circular first-in-first-out (FIFO) accesses without precluding out of order accesses to the same region of the tile-local scratchpad memory. In yet another example, the in-order circular FIFO accesses, in association with the microarchitecture, enable the dynamically sized data data-dependent address streams on statically sized regions of the tile-local scratchpad memory.

In yet another example, each tile includes a scatter-gather engine configured to manage issuing, fetching, tracking, and ordering of data streams. In yet another example, each scatter-gather engine is further configured to maintain at least 256 outstanding read requests in flight per tile. In yet another example, each scatter-gather engine is further configured to track and update a buffer occupancy to manage flow control.

In yet another example, a subset of the plurality of tiles each further includes a prefetch unit configured to cooperatively prefetch data stream instructions. In yet another example, the processor further includes a cross-lane unit configured to accelerate at least one of irregular control flow sequences or intra-vector dependent operations. In yet another example, each tile is configured to support scatters from off-chip memories to its scratchpad memory and gathers from its scratchpad memory to off-chip memories.

In yet another example, subsets of the plurality of tiles are grouped based on logically configurable vector widths. In yet another example, the logically configurable vector widths comprise a logical SIMD width.

In yet another example, the processor is part of a machine learning accelerator configured to execute neural network layers exhibiting semantic sparsity. In yet another example, the neural network layers include embedding or graph neural networks. In yet another example, the processor is connected to a number of other processors over a network configured to perform distributed scatter-gather and computation required by neural network layer computations that are dynamic, irregular, and memory-bound.

DETAILED DESCRIPTION

Overview

Figure 1A:
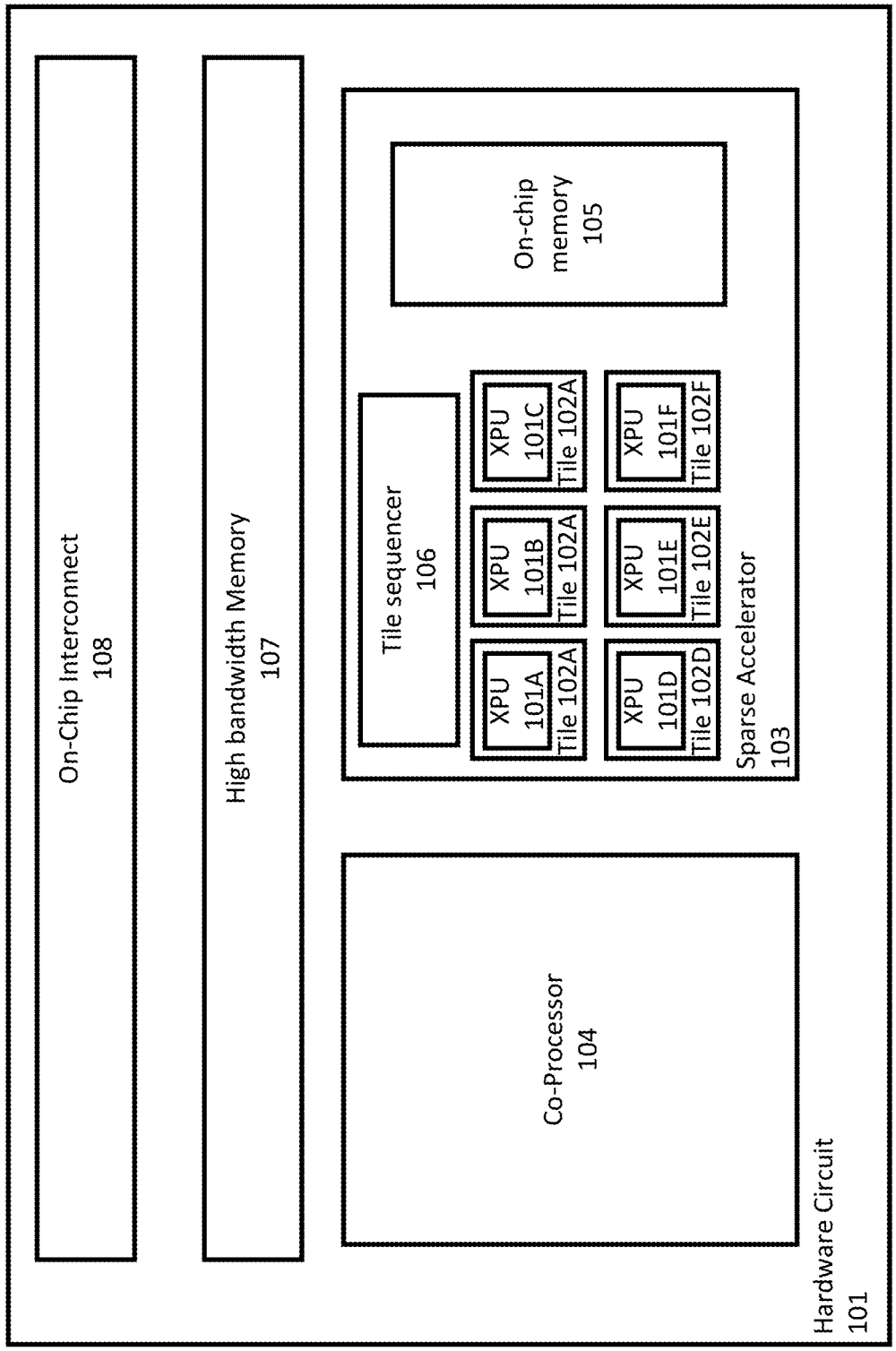
FIG. 1A is a block diagram of a hardware circuit for accelerating data-dependent operations, according to aspects of the disclosure.

Aspects of the disclosure provide for an accelerator capable of accelerating data-dependent, irregular, and/or memory-bound operations. An accelerator configured for accelerating data-dependent operations on sparse input may be referred to herein as a sparse accelerator.

A sparse accelerator can be organized as a tiled processor. The sparse accelerator can include a tile sequencer used to dispatch tasks to the tiles. Each tile of the sparse accelerator has a vector core, augmented with a cross-lane processing unit (XPU), and a slice of a shared software-controlled scratchpad memory. Together, the tiles and the sequencer can be connected to a high-bandwidth main memory.

The organization and structure of the sparse accelerator provides for the improvement of data-dependent, irregular, and/or memory-bound operations, through various combinations of different features described herein. Tiles of the accelerator can include one or more of the following features to utilize available compute more efficiently in the presence of data-dependent, irregular, and/or memory-bound operations. A cross-lane processing unit (XPU) in each tile accelerates common irregular control flow sequences and/or intra-vector dependent operations. Each XPU allows for providing custom fast data paths for common intra-vector dependent operations.

Other features that can be implemented on the accelerator as described herein can include cooperative prefetching and stream instructions and ordering. Cooperative prefetching reduces instruction fetch bandwidth requirements across tiles, enabling improved performance and energy efficiency. Stream instructions as described herein enable data-dependent scatter-gathers at high bandwidth. Each vector processing unit of the accelerator may generate data-dependent addresses to any level of the memory hierarchy, at high bandwidth.

Tile-local scatters and gathers can enable stall-free compute in the presence of data irregularity. Each accelerator tile can natively support high-performance scatters and gathers to its local memory, exposed by an instruction set architecture (ISA) with available instructions for indirect vector loads, stores, and store-adds.

Software-controlled tile-grouping of the implemented XPUs can provide for flexible amortization of control overheads. Software can group tiles flexibly to present logically configurable vector widths, e.g., logical SIMD-width. This can help amortize control overheads, like precluding redundant instruction fetch across tiles in the same group, enabling coalesced memory accesses across tiles. This can result in better bandwidth efficiency, e.g., high-bandwidth memory (HBM) may have different bandwidth efficiency at different access granularities. A data-dependent operation (also referred to as an "input-dependent operation") is an operation in which the amount of computational work to perform the operation is not known in advance but depends on the nature of the data. Computational work can be measured, for example, in the number of operations or processing cycles required to perform the data-dependent operation. Example data-dependent operations include operations for vector sorting, counting duplicate values within a vector, and operations for manipulating the shape or size of vectors of varying lengths. Data-dependent operations are irregular, at least because of differences in random memory access patterns for performing the same type of operation on different inputs. As a result, data-dependent operations are difficult to optimize performance for, as opposed to other types of operations in which the computational work does not vary based on the nature of the input data, such as its shape or degree or sparsity.

Data-dependent operations include operations performed on sparse data. The sparsity of a data structure is a measure of the ratio of its non-empty to empty elements. Depending on the data structure, an empty element may be zero, a reserved word indicating the absence of a value for the element or have a value so small as to be deemed to insignificantly contribute to an operation performed with the data structure as input. A data structure is sparse if it has more empty than non-empty elements. Some data structures can be more or less sparse than others.

Example data-dependent operations include generating an embedding for an input training example. An embedding can be a vector, or some other data structure mapped from an input, which has a higher dimensionality than the embedding. Embedding generation can be performed as part of a workload processed according to a pipeline.

The XPU of each tile of the sparse accelerator may also perform other data-dependent operations, such as vector scatter or gather operations, segment sums, and/or partition the sparse data structures, such as tensors. The XPU as described herein can be a complementary processing unit to other components of a processor or connected components, such as a vector processing unit built according to a SIMD parallel processing paradigm. One or more XPUs can be connected in respective processor cores of a larger processor, which itself may include other components for accelerating the performance of certain workloads, such as training neural networks.

Moreover, the XPU is not limited to performing a certain type of data-dependent operation, therefore a processor can be designed to include the XPU to complement other types of processing units for multiple different pipelines. Because the XPU can be configured on a per-workload basis, the physical footprint of the XPU is reduced versus other approaches in which specialized circuits are physically fabricated on a processor as complementary units for computation of sparse data. The functionality of the XPU can also be extended through the use of an instruction set or extension to an existing instruction set of the host processor, further improving the adaptability of different data-dependent operations as pipeline data receive changes. Instructions can be provided as signals to components of the XPU responsible for translating the instructions to configure the individual processing cells and crossbars of the XPU. The XPU can be configured using a program compiled by a corresponding compiler for the hardware circuit implementing the XPU.

Aspects of the disclosure provide for at least the following technical advantages. The accelerator as described herein provides for scalable, distributed training of large machine learning models requiring the performance of data-dependent operations whose operands are generally not known until run-time.

The accelerator, alone and in combination with other processors, enables flexible operational configurations of tiles implementing the XPU in the accelerator, for achieving various forms of parallelism, such as task, data, pipeline, and model parallelism. In task-level parallelism, each tile may execute independent computations (tasks) in parallel. For memory-level parallelism, tiles may issue memory requests in parallel to the high-bandwidth to soak up available memory bandwidth. This allows the sparse accelerator to handle varying amounts of work in different tasks.

The accelerator as described herein can be a dedicated co-processor alongside another accelerator or general-purpose processor not configured for accelerating data-dependent operations. The accelerator as described herein may accelerate sparse or other data-dependent computations to realize performance gains, e.g., in increased processing speed, over approaches relying on host memory to retrieve data for performing data-dependent operations.

The accelerator as described herein can function as an architectural ally to a co-processor configured for performing dense, regular, computations. Implementing a programmable sparse accelerator as described herein that is communicatively coupled to a separate processor can provide a flexible means for accelerating operations with a complexity that is not predictable at compile-time. The accelerator as described herein can target memory-bound operations, with complex data-movement, shuffling, and summarization. Operations of this type can include scatter-gather operations, filtering, sorting, uniquification, etc. The accelerator can be targetable according to a compiler stack, e.g., a compiler configured for converting source code into instructions executable by the accelerator and its co-processor.

The accelerator as described herein can accelerate embedding generation. Embedding generation can generally be characterized as involving irregular memory accesses with low-operational intensity. This is at least due to the need to perform on-chip table lookups of tables representing embedding maps and variable-width vector compute, given the sparse and irregular nature of input vectors for embedding generation. An embedding is a mapping from a discrete object, e.g., a vector or other data structure of values, to vectors of numerical values, such as real values. Embeddings are generally of a lower dimension and complexity than their corresponding pre-embedding object. For example, an embedding for one or more words in the English language can be a vector of real-valued numbers. Embeddings can be used to represent and identify potentially salient features of the pre-embedding input and can be compared, e.g., by measuring the distance between the embeddings of different words, to quantify the similarity between two pre-embedding inputs.

Cooperative pre-fetching as described herein reduces instruction fetch bandwidth requirements across tiles, enabling improved performance and energy efficiency. The tiled architecture of the accelerator exposes a multiple-program, multiple-data programming model, while additionally providing for a configurable subset of tiles operating in a single-program, multiple data model.

Stream instructions as described herein enable data-dependent scatter-gathers at high bandwidth. Each vector processing unit of the accelerator may generate data-dependent addresses to any level of the memory hierarchy, at high bandwidth. Stream instructions as described herein provide an architecturally, e.g., ISA-, visible construct that allows for data-dependent access pattern expression in software. These access patterns include indirect memory access including multiple addressing modes, configurable transfer size, and atomic operations. Stream instructions allow software to specify "start" addresses, "sizes," and "sequence patterns" for memory accesses. This is all while each tile of the accelerator implements separate cores for accessing data and servicing the requests using a scatter-gather engine, according to aspects of the disclosure.

Data can flow through different components of the processor and other off-chip components through a data stream, which are data values corresponding to addresses in the address stream. The data stream may have a stream descriptor, providing metadata characterizing the stream. As part of the metadata, a data stream can have a stream identifier, which can be used for identifying on which executing thread of the processor a stream is currently being processed. Multiple streams, e.g., eight, sixteen, or thirty-two streams, can be active and flowing through the processor at once.

Circular buffer instructions as described herein can enable variable-size dynamic data streams. Circular buffer instructions are architecturally, e.g., ISA-, visible constructs which allow software to fetch and operate on statically unknown size data streams, without explicitly allocating buffers at compile time. A scatter-gather engine tracks the run-time buffer size of the different data streams and manages flow control. The circular buffer instructions provide an architectural first in first out (FIFO) abstraction for the fast common case, without precluding software from non-FIFO access patterns, since the underlying memory is also accessible through standard loads and stores.

Stream and circular buffer instructions allow for common case FIFO abstraction while not precluding software from "random" accessing the memory if and when required. Software can FIFO fetch buffers but access data multiple times, with reuse within fetched buffer/windows if and when needed. This is in contrast to approaches in software that require multiple pops and pushes into a queue to reuse data. This control strikes a balance between when software issues pre-fetches versus the scatter-gather engine granularly fetching and performing flow control. Software gets higher-order bit rights in terms of when to roughly issue the stream, and a scatter-gather engine implementing stream ordering and instructions as described herein responds to granular variations in latency, buffer occupancy, etc.

A scatter-gather engine as described herein enables performant irregular memory access. A scatter-gather engine is implemented in each tile and manages the issuing, fetching, tracking, and ordering of software-defined address streams, e.g., stream instructions and circular buffer instructions. The engine can maintain a number of read memory requests, e.g., 256 requests, in flight, per tile. The scatter-gather engine tracks and updates buffer occupancy to rate-control address requests. Software can architecturally probe the occupancy of the buffer, without needing to explicitly manage latency variations in servicing individual address requests.

The combination of stream instructions, circular buffer instructions, and the scatter-gather engine enable decoupled access-execute and can effectively high long memory access latency, including for irregular memory access streams. This affords software the flexibility to generate data-dependent memory and the choice on scheduling them at a "coarse" granularity, with the scatter-gather engine configured for flow control and servicing the requests.

Aspects of the disclosure provide for an accelerator configured to execute multiple threads of dynamic, small-vector tasks across a set of compute tiles. Dynamic tasks include tasks involving data-dependent control and memory accesses. Small-vector tasks can include tasks performed on relatively smaller vectors, e.g., 8 element vectors. The tiles are managed by a single task management core, referred to as a sequencer. The compute and bandwidth ratios of the accelerator are tuned toward irregular, sparse access and compute of large datasets stored in off-processor high bandwidth memory.

The accelerator can include multiple tiles each including a respective access core and execute core. The access core can be a scalar unit used to decouple data movement from computation. The execute core can be another scalar unit attached to a vector unit with multiple SIMD lanes, configured for processing data fetched by a corresponding access core. Each tile can also include a respective XPU for performing cross-lane reduction, shuffle, sort, prefix-sum, etc. The accelerator can also include a sequencer, which can be a scalar unit for task management across the tiles and for communicating with other cores. The accelerator can also include scratchpad memory, e.g., eight megabytes of shared memory, although in different examples the size of the shared memory may vary. As described herein, the accelerator can implement a streaming memory access interface, to keep transactions outstanding against off-tile memories. The accelerator can also include a high bandwidth crossbar to connect tiles to the shared scratchpad memory, as well as to each other.

Example Systems

FIG. 1A is a block diagram of a hardware circuit 101 for accelerating data-dependent operations, according to aspects of the disclosure. The hardware circuit 101 can include a sparse accelerator 103, a co-processor 104, high-bandwidth memory 107, and an on-chip interconnect 108. The sparse accelerator 103 can include one or more tiles 102A-F, each tile implementing a respective vector processing unit (VPU) and including a respective cross-lane processing unit (XPU) 101A-F. The sparse accelerator 103 can include a tile sequencer 106 configured to coordinate input and output data across the tiles 102A-F. Example numbers of tiles implemented as part of the sparse accelerator 103 can include 8, 16, or 32 tiles.

The tiles 102A-F can be interconnected according to a variety of different topologies, e.g., as multi-dimensional rings or torii. The interconnect may include, for example, a crossbar, described in more detail with reference to FIG. 1B. The crossbar or interconnect for the processor can receive and emit data for each clock cycle, for example from and to the tiles 102A-F, on-chip memory, and off-chip memory.

The tile sequencer 106 is a component of the sparse accelerator 103 configured for receiving and distributing instructions for performing operations on the tiles 102A-F in an orchestrated manner. The orchestration can be governed at least in part by utilizing the distributed relationship of processing components on the sparse accelerator 103, for example to leverage different types of data or instruction parallelism. The tile sequencer 106 is described in more detail with reference to FIG. 4.

The sparse accelerator 103 is configured for performing data-dependent operations using the tiles 102A-F. As shown and described in more detail with reference to FIG. 3A, each tile can implement a number of data processing lanes for streaming data through vector processing units (VPUs) and cross-lane processing units (XPUs). A tile can retrieve streamed data from the on-chip memory 105, which can be any of a variety of different memory devices, including main memory, cache, or persistent storage, such as solid state or hard disk storage. The streamed data can also be retrieved from the co-processor 104, the high bandwidth memory 107 servicing one or both of the co-processors 103 and 104, and/or another source of data connected to the hardware circuit 101 through the on-chip interconnect 108.

On-chip memory 105 can be a scratchpad memory physically distributed across each tile 102A-F. The scratchpad memory can be programmatically managed, e.g., storing data in accordance with software instructions, as opposed to a hardware cache. The on-chip memory 105 can be globally addressable through a variety of different interfaces, such as direct memory access and/or stream interfaces.

The co-processor 104 can be any core, such as a CPU, dense core, etc. For example, the co-processor 104 can be configured for acceleration of certain operations, such as matrix-matrix multiplication, matrix-vector multiplication, etc. Examples of operations can include dense matrix-matrix computations, in which the majority, e.g., greater than fifty percent in some examples, of elements in the multiplied matrices have non-zero values. The computational complexity can be approximated as a function of the dimensions of the matrices multiplied. In some examples, the co-processor 104 is on a different device than the rest of the hardware circuit 101 and communicates data to the hardware circuit through the on-chip interconnect 108. The on-chip interconnect 108 can be a data bus or any form of interconnect according to any of a variety of communication standards, for example PCIe. The on-chip interconnect can also implement a core memory network. The core memory network can be an on-chip network that connects the co-processor 104 and sparse accelerator 103.

Example features of the sparse accelerator 103 are directed to improving the computation of sparse operations, e.g., operations on operands or inputs in which there are generally more zero-valued than non-zero-valued elements. Features of this type can include a combination of performing sparse operations using the programmable XPUs 101A-101F, cooperative memory prefetching, and/or instruction streams or instruction ordering, as described in more detail here.

Although examples are provided in the context of sparse computations, it is understood that in some examples the sparse accelerator 103 can be used to accelerate other types of operations commonly associated with acceleration of machine learning model processing, including linear algebra operations such as vector/matrix multiplication, calculating activation function outputs, pooling layer outputs, normalizing layer outputs, etc. The co-processor 104 and sparse accelerator 103 implemented as part of a common hardware circuit 101 can facilitate the distribution of different tasks suitable for either of the two, without limitation. Non-sparse operation acceleration can include dense computations, e.g., computations on non-sparse input. Example dense computations can include linear or strided access of an array. Other examples include dense matrix multiplication, fully connected layers, and convolutional layers of a deep neural network.

An example input to the hardware circuit 101 can be data structured as a tensor. For example, a tensor can represent input data and/or model parameter values of a machine learning model to be executed using the hardware circuit 101. A tensor is a data structure generalizing various other common data structure types of differing dimensions. A tensor can include zero or more elements, which can be of one or more different data types, such as integers, floating-point values, Boolean values, etc. Within each data type, a data type can be parameterized according to a certain level of precision, for example an 8-bit, 16-bit, or 32-bit integer or floating-point value. The dimension of a tensor is referred to as its "rank." A tensor of rank zero is a single element, also called a scalar. A tensor of rank one is also called a vector. A tensor of rank two is also called a matrix. Vectors and matrices can also be referred to as having different ranks. For example, a vector of rank two is equivalent to a matrix. A tensor of a non-zero rank can be described as a collection of tensors one rank lower. For example, a vector or rank one is a collection of scalar values, and a matrix of rank two is a collection of vectors of rank one.

The hardware circuit 101 may at least partially implement a processing pipeline for training a neural network. The pipeline may include generating embeddings for input training examples. Feature tensors for different input training examples will have different degrees of sparsity, which affect the amount of computational work required to generate a corresponding embedding. The sparse accelerator 103 can be configured to receive a tensor of feature values representing a training input example and generate an embedding as a tensor having a lower rank than the feature tensor.

To generate the embeddings, the sparse accelerator 103 is configured to implement a variety of data-dependent operations for efficient sparse data computation on the XPUs 101A-F, or more generally, the VPUs. These operations include sorting or summing sparse vectors, operations for summarizing the contents of input vectors, and operations for translating sparse matrices from one sparse matrix storage format to another.

Instead of physical predetermined circuits for accelerating the performance of data-dependent operations, the VPUs, including the XPUs 101A-F, can be configured, for example programmed, to perform a variety of different data-dependent operations. The sparse accelerator 103 allows for generalized support of processing sparse data, while still allowing a complementary co-processor 104 to perform other types of operations.

The hardware circuit 101 can be any of a variety of different types of processing units, for example a central processing unit (CPU), a graphics processing unit (GPU), a field-programmable gate array (FPGA), or an application-specific integrated circuit (ASIC), such as a tensor processing unit (TPU). The hardware circuit 101 can be implemented on a computing device, which itself may be part of a system of one or more devices.

Figure 1B:
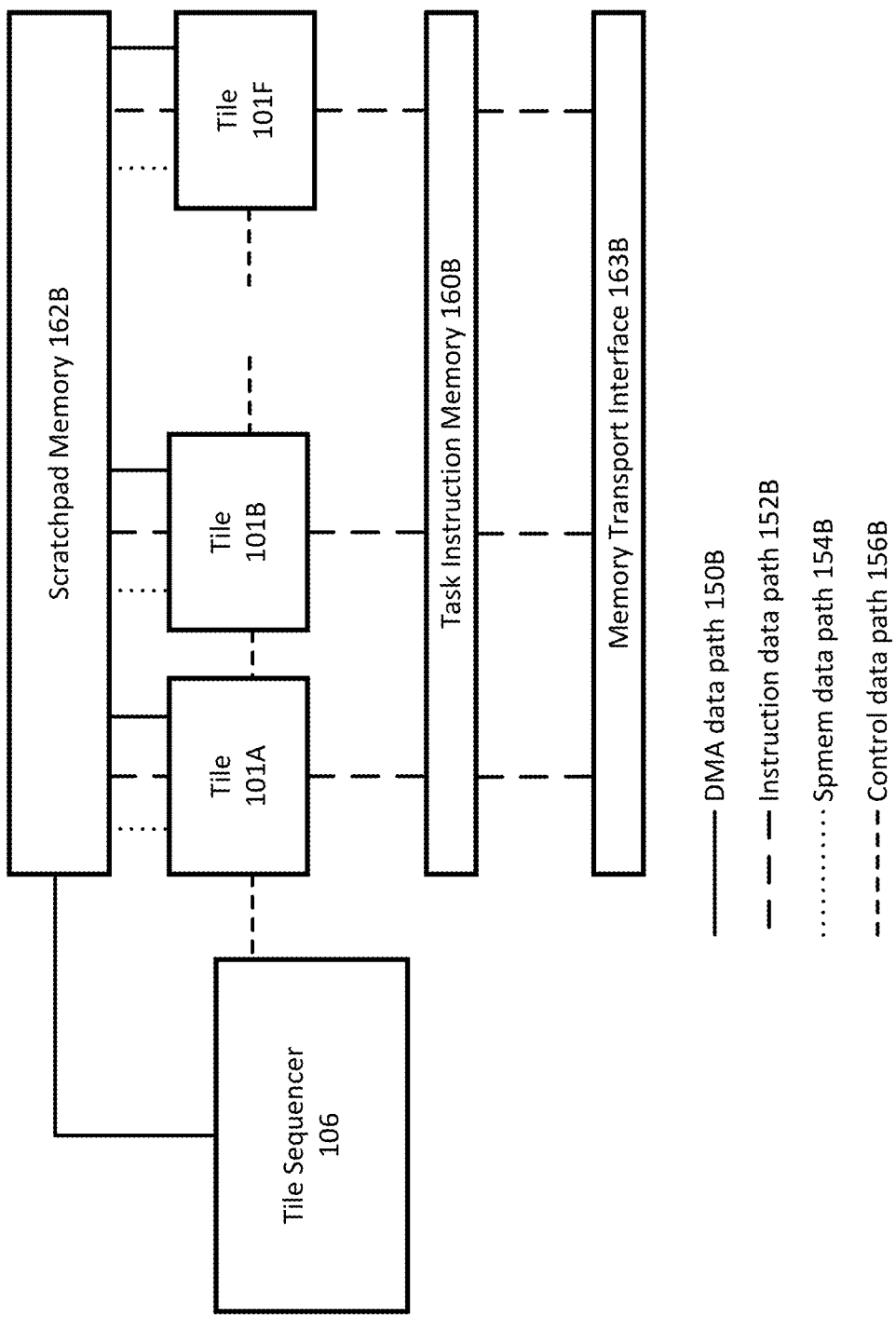
FIG. 1B is a block diagram of example data paths implemented as part of the hardware circuit, according to aspects of the disclosure.

FIG. 1B is a block diagram of example data paths implemented as part of the hardware circuit, according to aspects of the disclosure. Scratchpad memory 162B and task instruction memory 160B can form part of the on-chip memory 105.

Various data paths 150B, 152B, 154B, and 156B are illustrated. These data paths may or may not physically share a direct memory access (DMA) path 150B, that includes circuit interconnects between the tile sequencer 106 and the tiles 102A-F, for DMA of the scratchpad memory 162B. Instruction data path 152B includes circuit interconnects between the tiles 102A-F, the task instruction memory 160B, the scratchpad memory 162B, and a memory transport interface 163B. Scratchpad (spmem) data path 154B shows a potential path for data from the task instruction memory 160B to the tiles 102A-F. Control data path between tile sequencer 106 and the tiles 102A-F shows an example path for control signals generated by the tile sequencer 106. The control signals, when received by the tiles 102A-F, can cause the tiles to perform one or more primitive or compound operations, such as reading data, writing data, and/or processing data according to one or more functions specified by the control signals.

Task instruction memory 160B is shared by the tiles 102A-F. The task instruction memory 160B holds programs that can be executed by a tile access core and a tile execute core. In some examples, the task instruction memory 160B is 468 bits wide and 16,000 words deep and can be organized as banks of 2,000 words, for example, including error correction codes. The multiple banks allow for multiple reads or writes to and from the task instruction memory 160B per block cycle. A DMA descriptor for the task instruction memory 160B can include a length field in multiples of 64 bytes. Instruction bundles can be zero padded from a most significant bit to a 512-bit boundary when stored in high-bandwidth memory. The sparse accelerator 103 may drop the padded bits before writing to the task instruction memory 160B. Each DMA descriptor can transfer one task instruction memory bundle.

The tile sequencer 106 can be a scalar core primarily responsible for dispatching tasks to tiles and/or initiating DMA transfers. For example, the tile sequencer can receive instructions as bundles. The instructions in a bundle can be executed in parallel across the tiles 102A-F and can update the architectural state concurrently. When a bundle is executed, it undergoes a scalar or vector issue before the instructions in the bundle are executed. The scalar or vector issue may be held for one or more cycles due to various conditions documented under the hold-scalar-issue for each scalar instruction or hold-vector-issue for each vector instruction. An ISA for the sparse accelerator 103 can define a number of global scalar-hold-issue conditions or global vector-hold-issue conditions, which can hold bundles unconditionally. During the scalar issue or vector issue, a number of actions may be performed. Predicates for the bundle are evaluated and updated. The value of registers to be used can be recorded. Branches in the instruction can be performed, and the registers are updated.

Banks of the task instruction memory can implement one or more of the following interfaces. Each bank can include a prefetch request and prefetch response broadcast bus. The prefetch request and response bus architecture are tuned for SPMD (single program, multiple data) mode of operation. The read response may be broadcast to all tiles on the prefetch response broadcast bus. The bundle broadcast allows hardware to duplicate requests originating from another tile when possible and reduce the overall bandwidth demand.

Figure 2:
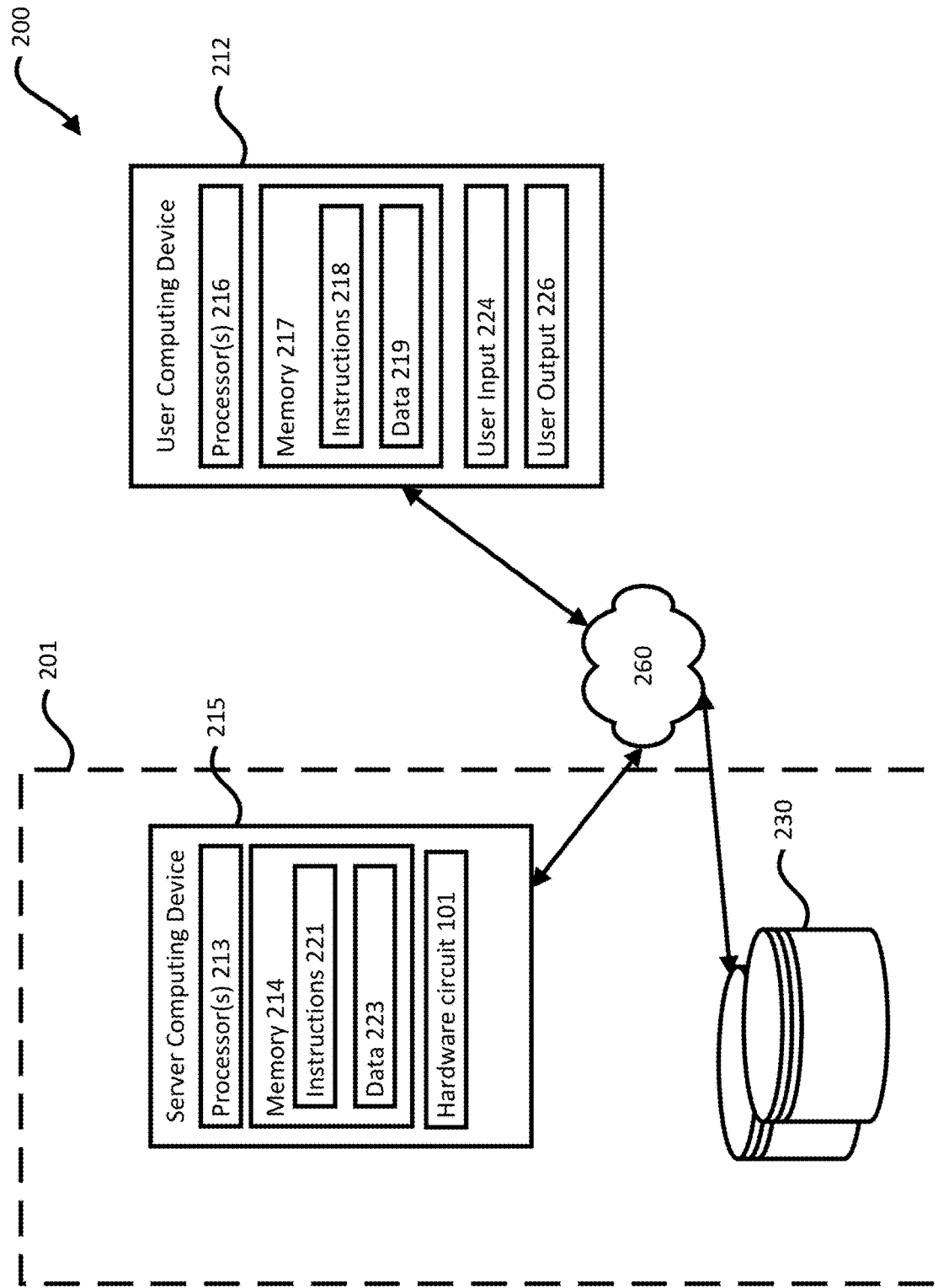
FIG. 2 is a block diagram of an example environment for implementing the hardware circuit, according to aspects of the disclosure.

FIG. 2 is a block diagram of an example environment 200 for implementing the hardware circuit 101. The hardware circuit 101 can be implemented on a device having one or more processors in one or more locations, such as in server computing device 215. User computing device 212 and the server computing device 215 can be communicatively coupled to one or more storage devices 230 over a network 260. The storage device(s) 230 can be a combination of volatile and non-volatile memory and can be at the same or different physical locations than the computing devices 212, 215. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 215 can include one or more processors 213 and memory 214. The memory 214 can store information accessible by the processor(s) 213, including instructions 221 that can be executed by the processor(s) 213. The memory 214 can also include data 223 that can be retrieved, manipulated, or stored by the processor(s) 213. The memory 214 can be a type of non-transitory computer readable medium capable of storing information accessible by the processor(s) 213, such as volatile and non-volatile memory. The processor(s) 213 can include one or more central processing units (CPUs), graphic processing units (GPUs), field-programmable gate arrays (FPGAs), and/or application-specific integrated circuits (ASICs), such as tensor processing units (TPUs). The processor(s) 213 can include a co-processor and a sparse accelerator implemented as part of the hardware circuit, as described herein with reference to FIGS. 1A-B.

The instructions 221 can include one or more instructions that when executed by the processor(s) 213, causes the one or more processors to perform actions defined by the instructions. The instructions 221 can be stored in object code format for direct processing by the processor(s) 213, or in other formats including interpretable scripts or collections of independent source code modules that are interpreted on demand or compiled in advance. The instructions 221 can include instructions for configuring stream transfers consistent with aspects of this disclosure. The server computing device 215 and/or the user computing device 212 can implement a compiler or other program for generating and sending instructions to the hardware circuit 101 as control signals for configuring the tiles of the circuit.

The data 223 can be retrieved, stored, or modified by the processor(s) 213 in accordance with the instructions 221. The data 223 can be stored in computer registers, in a relational or non-relational database as a table having a plurality of different fields and records, or as JSON, YAML, proto, or XML documents. The data 223 can also be formatted in a computer-readable format such as, but not limited to, binary values, ASCII, or Unicode. Moreover, the data 223 can include information sufficient to identify relevant information, such as numbers, descriptive text, proprietary codes, pointers, references to data stored in other memories, including other network locations, or information that is used by a function to calculate relevant data.

The user computing device 212 can also be configured similar to the server computing device 215, with one or more processors 216, memory 217, instructions 218, and data 219. The user computing device 212 can also include a user output 226, and a user input 224. The user input 224 can include any appropriate mechanism or technique for receiving input from a user, such as keyboard, mouse, mechanical actuators, soft actuators, touchscreens, microphones, and sensors.

The server computing device 215 can be configured to transmit data to the user computing device 212, and the user computing device 212 can be configured to display at least a portion of the received data on a display implemented as part of the user output 226. The user output 226 can also be used for displaying an interface between the user computing device 212 and the server computing device 215. The user output 226 can alternatively or additionally include one or more speakers, transducers or other audio outputs, a haptic interface or other tactile feedback that provides non-visual and non-audible information to the platform user of the user computing device 212.

Although FIG. 2 illustrates the processors 213, 216 and the memories 214, 217 as being within the computing devices 215, 212, components described in this specification, including the processors 213, 216 and the memories 214, 217 can include multiple processors and memories that can operate in different physical locations and not within the same computing device. For example, some of the instructions 221, 218 and the data 223, 219 can be stored on a removable SD card and others within a read-only computer chip. Some or all of the instructions and data can be stored in a location physically remote from, yet still accessible by, the processors 213, 216. Similarly, the processors 213, 216 can include a collection of processors that can perform concurrent and/or sequential operation. The computing devices 215, 212 can each include one or more internal clocks providing timing information, which can be used for time measurement for operations and programs run by the computing devices 215, 212.

The server computing device 215 can be configured to receive requests to process data from the user computing device 212. For example, the environment 200 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 212 may receive and transmit data specifying a workload or type of composed operation the XPUs of the sparse accelerator 103 should be configured to perform. The user computing device 212 can send the instructions directly to the hardware circuit 101 or cause the server computing device 215 to generate and send instructions as control signals to the hardware circuit 101 as described herein.

The devices 212, 215 can be capable of direct and indirect communication over the network 260. The devices 215, 212 can set up listening sockets that may accept an initiating connection for sending and receiving information. The network 260 itself can include various configurations and protocols including the Internet, World Wide Web, intranets, virtual private networks, wide area networks, local networks, and private networks using communication protocols proprietary to one or more companies. The network 260 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol: or with a variety of communication standards, such as the LTE® standard for wireless broadband communication. The network 260, in addition or alternatively, can also support wired connections between the devices 212, 215, including over various types of Ethernet connection.

Although a single server computing device 215 and user computing device 212 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 3A:
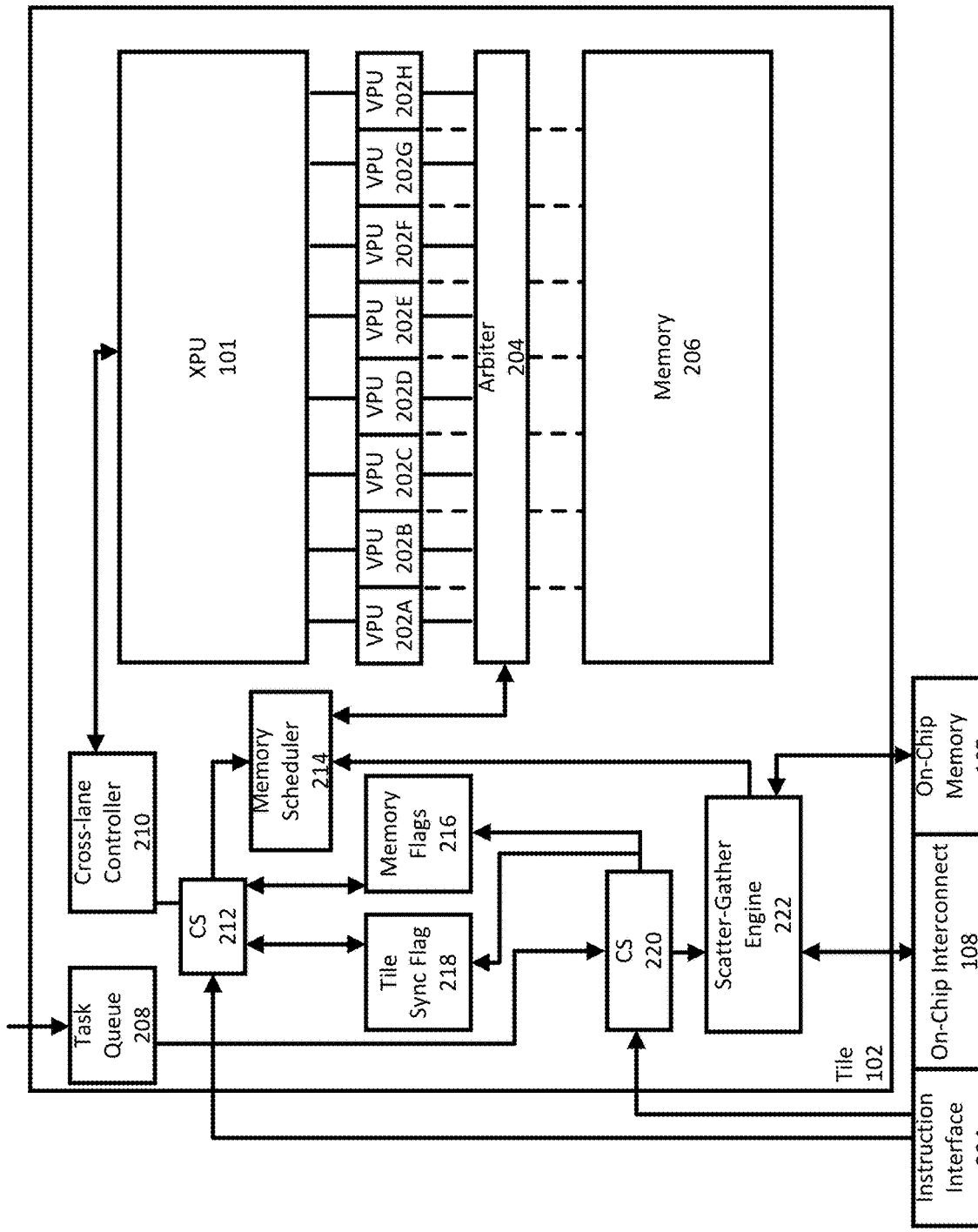
FIG. 3A is a block diagram of an example tile, according to aspects of the disclosure.

FIG. 3A is a block diagram of an example tile 102. The XPU 101 is coupled to a cross-lane controller 310. The cross-lane controller 310 provides a separate thread of control to allow cross-lane instructions on the XPU 101. As described herein, the XPU 101 can receive a first instruction, for example through one or more control signals, which can be converted into one or more second and third instructions and provided to processing cells and crossbars of the XPU 101, respectively, for performing a composed operation specified by the first instruction. Instructions to the XPU 101 can be carried over control signals, in which processing cells and crossbars of the XPU 101 are configured to interpret to perform a corresponding primitive operation. An example instruction can be an opcode of an instruction set architecture (ISA).

The tile 102 can receive data from the on-chip interconnect 108, as well as from the on-chip memory 105 as described with reference to FIG. 1A. The XPU can also receive instructions from an instruction interface 324, for example from the tile sequencer 106, through a scalar core 312 or scalar core 320. A scatter-gather engine 322 of the tile 102 can receive incoming data, and control what data is passed in the memory 306 through a memory scheduler 314. In some examples, instead of a scatter-gather engine, the scatter-gather engine 322 may be referred to as a read-write engine 322.

The memory scheduler 314 can coordinate how data is accessed and retrieved from the memory 306. The memory 306 is private to the tile 102, and not accessible by other components connected to the tile 102, such as other tiles. Arbiter 304 is configured to manage which of vector processing units (VPUs) 302A-H access the memory 306, for example on a clock-cycle to clock-cycle basis. The tile 102 can maintain a task queue 308 of tasks to be performed by the tile 102, which are sent to the scatter-gather engine 322 through the scalar core 320. The tile 102 can also maintain registers of tile synchronization flags 318 and/or memory flags 316 for synchronizing the tile 102 with other tiles of the hardware circuit and the memory 306, respectively.

VPUs 302A-H are connected to the XPU 101 through data processing lanes, indicated by solid lines between the XPU 101 and the VPUs 302A-H. The dashed lines between the XPU 101 and the VPUS 302A-H represent control signals, which can be received by control cells in the XPU 101 for configuring the XPU 101 to perform a composed operation corresponding to the received control signals. A vector processing unit is configured for efficient operation on input vectors. The length of vectors processed by the tile 102 at a time can depend on the number or width of VPUs implemented by the tile. For example, eight VPUs 302A-H are 8-wide. VPUs 302A-H can process data along the same data processing lane. The VPUs 302A-H can be configured to perform scalar operations on elements of incoming vectors from the memory 306. The VPUs 302A-H can receive data from the XPU 101, which, as described herein, can process data across the data processing lanes, instead of merely along the lanes as performed by each VPU 302A-H.

Figure 3B:
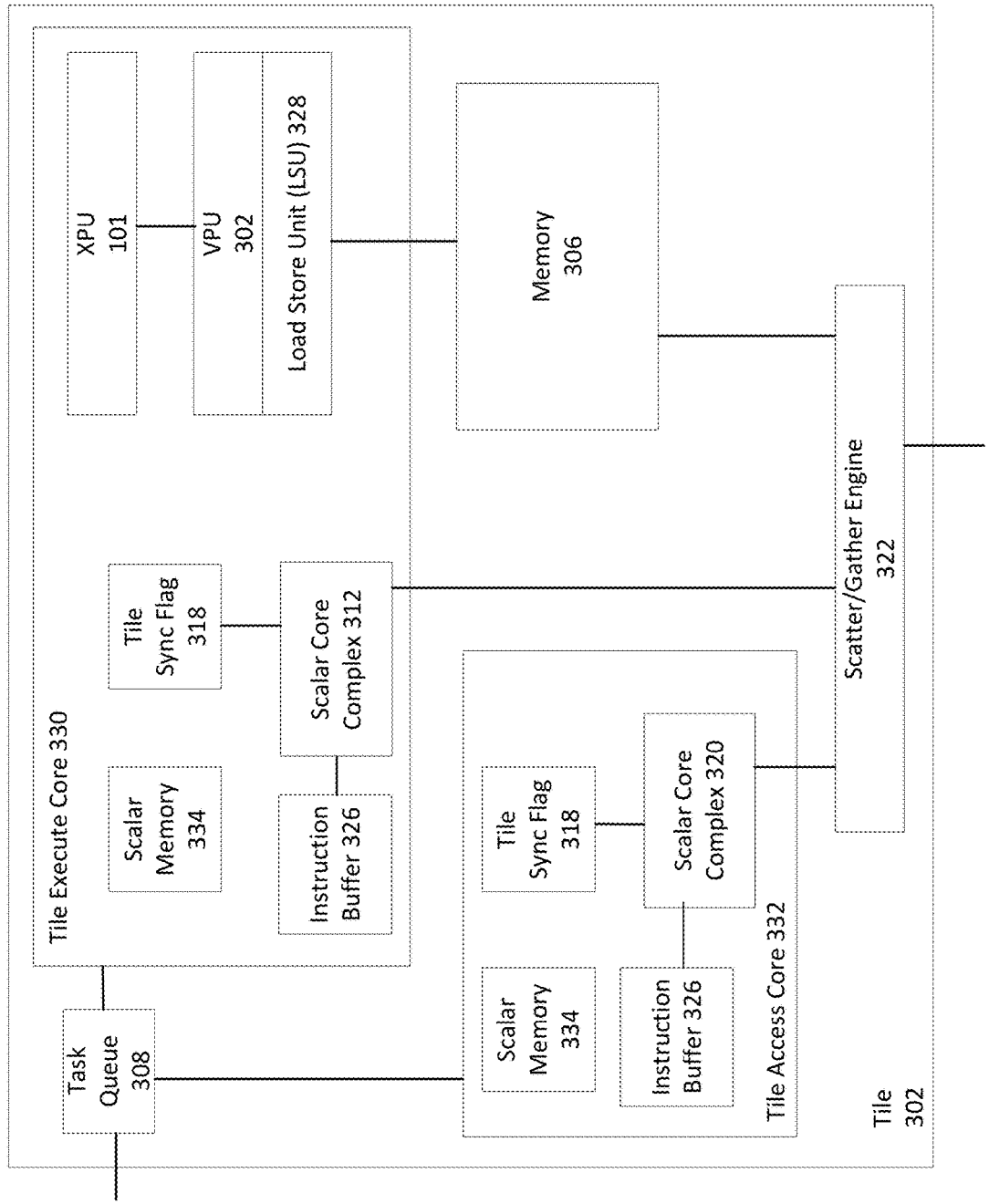
FIG. 3B is a block diagram of another example tile implementing an XPU for stream transfers, according to aspects of the disclosure.

FIG. 3B is a block diagram of another example tile 392 implementing an XPU 101 for stream transfers. The tile 392 can receive data from the on-chip interconnect 108, as well as from the on-chip memory 105 as described with reference to FIG. 1. The XPU 101 can also receive instructions from an instruction interface 324, for example from the tile sequencer 106. A scatter-gather engine 322 of the tile 392 can receive incoming data, and control what data is passed in the memory 306.

This example tile 392 is based on a decoupled access/execute architecture, where a program (and the associated sequence of instructions) can be separated into two streams. The first stream can be an access stream to fetch operands and store results. The second stream can be an execute stream that consumes operands, performs computations, and produces results. These streams run on two separate cores: the tile access core (TAC) 332 and the tile execute core (TEC) 330, which form part of the decoupled access/execute architecture. The TAC 332 is a scalar unit used to decouple data movement from data computation, e.g., decoupling the fetching of data from memory versus the processing of the fetched memory. The TEC 330 is a scalar unit attached to a VPU with multiple SIMD lanes, e.g., eight SIMD lanes, used to process vectors.

The tile access core 332 is based on a scalar core complex 320 and can be responsible for prefetching operands for executing from the memory 306 or from high bandwidth memory outside of the tile 392. The tile execute core 330 is based on a scalar complex core 312 and includes the XPUs 101 and VPUs 302 and can be responsible for performing compute operations on the prefetched operands to produce results. The VPUs 302 are connected to the memory 306 through a load store unit 328. The load store unit 328 is configured to perform gather and scatter operations for data passing through the tile 303. The gather-scatter operations can be performed granularly, e.g., at 4 bytes granularity. The load-store unit 328 can implement load and store queues for managing bank conflicts. The LSU 328 can provide load/store access to a subset of the scratchpad memory.

The TAC 332 and TEC 330 have independent instruction streams and together form a producer-consumer pair. The tile 102 can maintain a task queue 308 of tasks to be performed by the tile 102, which are sent to TAC 332 and TEC 330.

The task queue 308 can include one or more queues for push and popping instructions. For example, the task queue 308 can have a first queue, e.g., a First-In, First-Out (FIFO) queue to push values from the TAC 332 to the TEC 330. The TEC 330 can pop and process enqueued values. As another example, the task queue 308 can include additional queues for connecting the TAC 332 and the TEC 330 in the opposite direction.

The TAC 332 and TEC 330 communicate with each other through a tile-local scratchpad memory (SpMEM), such as memory 306. The TAC 332 and TEC 330 can also communicate through scalar memory 334, instruction buffer 326, and tile sync flag 318. The memory 306 can be used by the TAC 332 and TEC 330 to exchange data and can be used as a software-managed circular buffer to pass data between the TAC 332 and TEC 330 in a first in first out order. The tile sync flags 318 can be used as a counting semaphore between the TAC 332 and the TEC 330. For example, when a circular first in first out order is being used between the two cores, the producer core increments the sync flag 318 by the number of bytes after every push, stalling when the count reaches the maximum size of the first in first out order. Similarly, the consumer decrements the sync flag 318 after every pop, stalling when the buffer has no data. As the amount of data prefetched can be dynamic, a done bit is used to indicate the end of stream.

Tile sync flag 318 can include a set of 32 sync flag registers, in some examples. Each register can store 32 bits of data, plus a "done" bit and an "enable_public_access" bit. The tile sync flag 318 registers may be implemented as a monolithic flop array, allowing simultaneous accesses from all sources. In case of address conflicts between writes, priority of accesses among the sources can be specified. For example, scalar miscellaneous instructions may have absolute priority. In some examples, only one of the scalar miscellaneous instructions may be issued. Read-modify-write operations are pipelined, and so, back-to-back read-modify-write operations to any sync flags may be supported.

DMA updates, stream updates, and remote writes may be combined onto a single (external) interface using round-robin arbitration. The external interface, e.g., from the tile to an external source, may have a separate access path to the sync flags, for example a data path as shown and described with reference to FIG. 1B.

Each of the banks of the task instruction memory 160B can perform a cycle-by-cycle arbitration among tile requesting data stored in the banks. The banks can use a distributed arbitration scheme to select a winner across TAC 332 and TEC 330 within the sparse accelerator 103 that gets access to the bank. The arbitration can ensure that request bandwidth is split equally among the requesting tiles. The requests can be to prefetch data, for example by the respective TACs for each tile. For example, the winning prefetch request is given highest priority access to one of the accessed banks.

Accesses from the sparse accelerator 103 through control status registers can have the next highest priority, being delayed only by a prefetch read request. Control status registers (CSR) can be implemented as part of a processor for storing additional information results of machine instructions executed by the sparse accelerator 103. The sparse accelerator 103 can maintain an indirect CSR timeout status bit for determining whether a CSR access is prevented from completing. After bank accesses and CSR accesses, DMA reads or writes can be prioritized last. The DMA operation, e.g., a read or write, can be delayed when accessing a busy bank. In some examples, the priority of how access operations are arbitrated and resolved on sparse accelerator 103 can vary.

Decoupling the accessing of data from the execution of data has at least the following benefits. Long, e.g., 600 cycles, memory latency is more effectively tolerated, as the TAC 332 can perform address calculation and prefetch required data. The described architecture also has increased tolerance for control latency. Dynamic dependencies make it difficult to resolve loop conditions, which can prevent effective software unrolling. The TAC 332 can run ahead to resolve these dependencies, if the condition can be determined outside of the TEC 330, providing a way to hide control latency.

Figure 4:
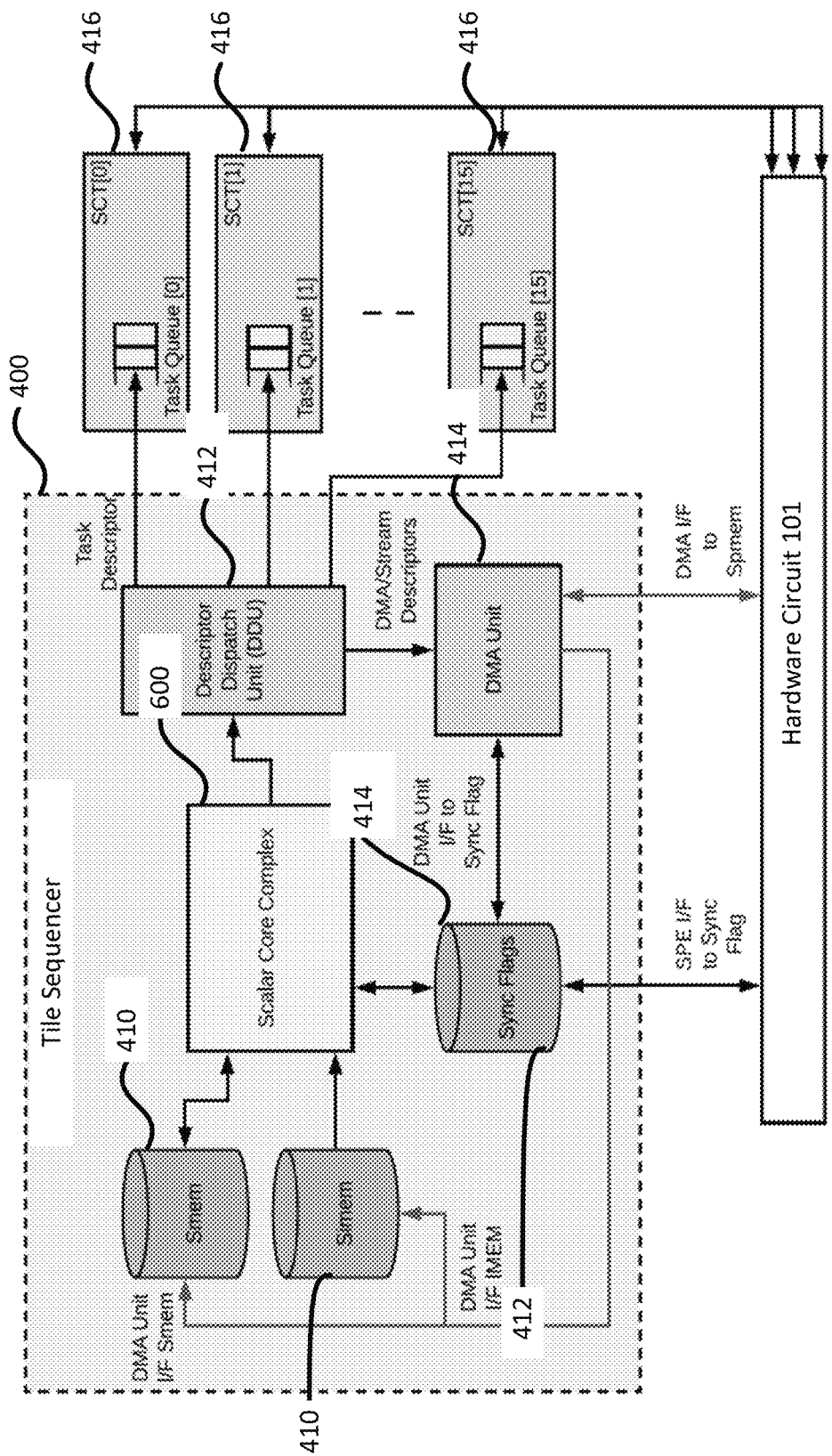
FIG. 4 is a block diagram of a tile sequencer, according to aspects of the disclosure.

FIG. 4 is a block diagram of a tile sequencer 400, according to aspects of the disclosure. Sequencer memory 410 (Simem) has the width of a VLIW instruction bundle, and can have a depth of approximately 8,000 bundles, although the width and number of bundles of the sequencer memory 410 can vary from implementation-to-implementation. The sequencer memory 410 may be read or written through direct memory access or through indirect access. This can be done whether or not the sequencer 400 is currently running A sequencer memory DMA memory descriptor can have a length field in multiples of 32 bytes. Each bundle can be zero-padded from a most significant bit to a 256-bit boundary when stored in high-bandwidth memory. The padded bits have read-as-zero and write-ignored (RAZ/WI). Each memory descriptor can transfer one instruction bundle.

The sequencer memory 410 may be organized as two banks with sequential addresses between the banks. Each bank can do one read or one write per clock cycle. The interleaving allows sequential instruction sequences to consume only half of each bank's bandwidth. A pathological minimum-sized loop can only consume three-quarters of a given bank's bandwidth, which still leaves sufficient bandwidth for accesses to make forward progress.

Each sequencer memory bank in the sequencer memory 410 can follow the following interfaces: The sequencer memory 410 can receive a read request from an instruction data path, e.g., the instruction data path as shown and described with reference to FIG. 1B. The banks of the sequencer memory 410 can also receive DMA writes and reads, as well as control status register access through an indirect register interface. Reads from the instruction data path may have the highest priority access to each bank in the sequencer memory 410. DMA reads, writes, and CSR access may have equal priority and undergo a least recently used (LRU) arbitration for a bank that is not busy doing an instruction fetch.

The sequencer 400 can fetch its instructions from the sequencer memory 410. The sequencer 400 runs the control thread of the program, which entails generating descriptors which are dispatched by descriptor dispatch unit 413 (for task and stream descriptors) and DMA unit 414 (for DMA descriptors), respectively. Task descriptors are provided to tile FIFOs 416, which are then performed by their respective tiles. DMA descriptors can be passed to other components of the hardware circuit 101, and other off-chip components. The sequencer communicates with other cores in the system and coordinates tasks across the tiles of the accelerator.

The current state of the sequencer 400 may be determined by reading a corresponding status register. Other registers related to instruction bundle fetch and execution are the program counter, and branch state. Tile sequencer 400 can issue a DMA descriptor that can be throttled by hardware. The hardware allows a predetermined number of DMAs issued by the sequencer to be outstanding that has a sync flag stored among sync flags 418. Throttling can be enabled or disabled, as needed.

Sync flags can appear in two or more types. Sync flags 418 can appear in the tile sequencer 400. Other sync flags can be stored in the TAC and TEC of each tile. In total, all of the sync flags can be laid out in a single address space, accessible to DMA operations, atomic remote set/add instructions, and atomic tile set/add instructions. There are a number of interfaces which can be implemented between sync flags in a tile and sync flags in the sequencer 400. A DMA operation may atomically add values to a sync flag during execution may set the "Done" bit upon completion. A stream operation may atomically add values to a sync flag during execution and may set the "Done" bit upon completion. Remote write instructions generate a single-word control write that can atomically set or add a value to a sync flag. These can be from atomic remote set/add instructions that are used to update a remote sync flag. These can also be from atomic tile set/add instructions that are used to update sync flags within a sparse accelerator. Another interface that can be implemented is a write interface, in which the set sync flag and add sync flag instructions make an atomic update to a sync flag, including optionally modifying a "Done" bit. Another interface that can be implemented is a read interface.

The sync flags 418 can be organized in memory as a number of banks. Each entry can include a number of bits of data, e.g., 32 bits of data, plus a "Done" bit and an "enable_public_access" bit. The banks can implement cycle-by-cycle arbitration separately for read and write ports, for example to prioritize scalar miscellaneous instructions over DMA, stream, and remote write updates. Sync flag registers in the TAC and TEC may also store a number of bits, a "Done" bit, and an "enable_public_access" bit.

Sync flags in the TAC or TEX can be implemented as a monolithic flop array allowing simultaneous accesses from all sources. Like the sequencer sync flags, the tile sync flags can be managed according to a priority scheme to avoid conflicts between writes.

Figure 5:
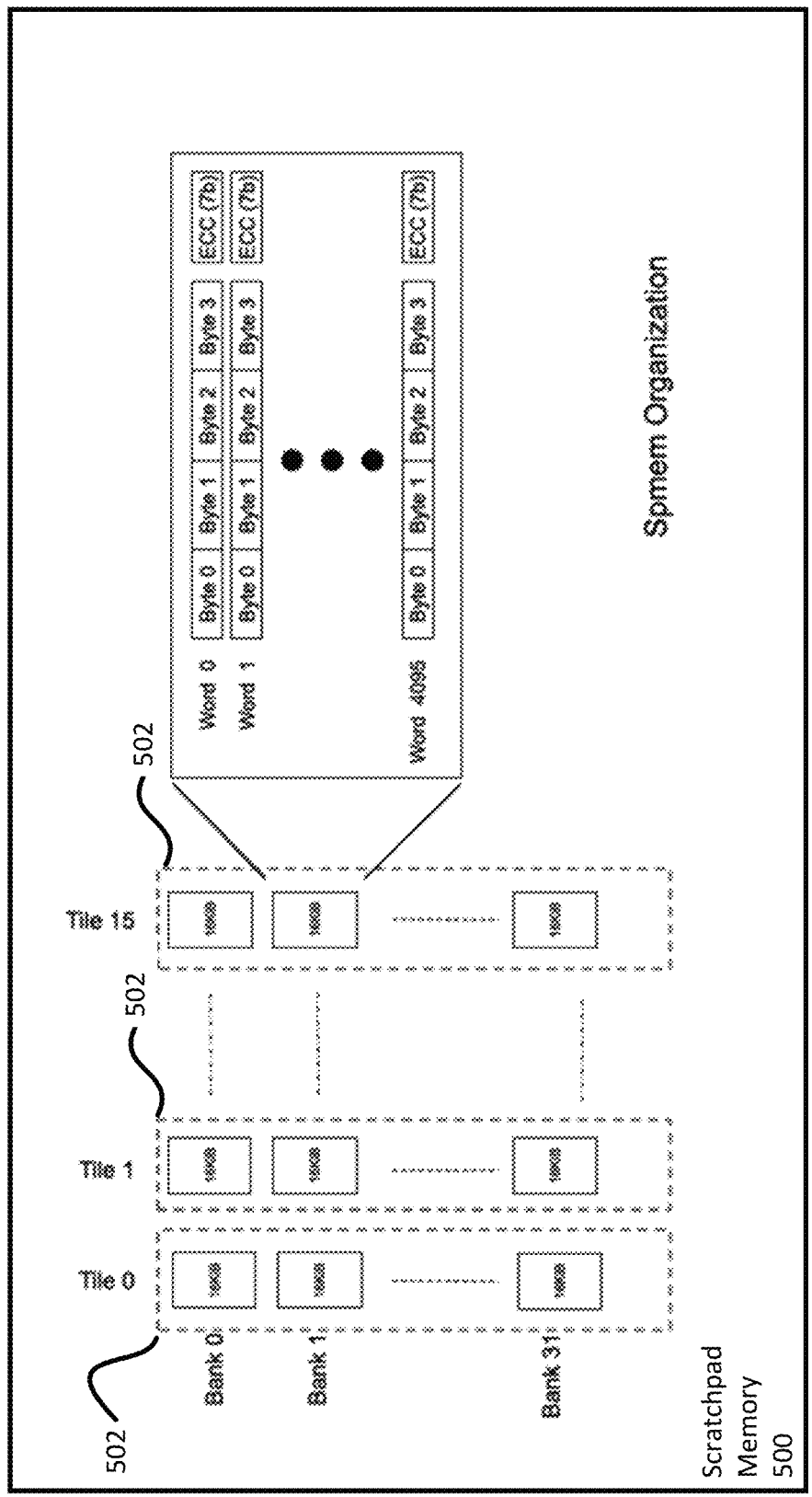
FIG. 5 is a block diagram of an example scratchpad memory with memory across a plurality of tiles of a sparse accelerator, according to aspects of the disclosure.

FIG. 5 is a block diagram of an example scratchpad memory 500 with memory across a plurality of tiles of a sparse accelerator, according to aspects of the disclosure. Each tile can include a respective portion of scratchpad memory 502, referred to as tile scratchpad memory or TileSpmem. Tile scratchpad memory 502 may be accessed by the tile through a load/store interface, implemented as one or more circuits. The tile scratchpad memory 502 can also be used as a buffer local to its respective tile for moving data in and out of the tile using stream instruction transfers.

As shown in FIG. 5, each tile scratchpad memory 502 can include a number of banks, e.g., 32 banks, respectively labeled as bank 0-31. Each bank can hold a uniform amount of data, e.g., 16 kilobytes. Each bank can hold a number of words, e.g., four-byte words and a 7-bit error correction code. In some examples, the banks can hold 4096 words. It is understood that the scratchpad memory 500 can be implemented with different numbers of tile scratchpad memories 502, each of which can hold different banks of different sizes. Each bank is also understood to be able to be implemented in various examples to store different numbers of words with different sizes.

Words and banks within a tile scratchpad memory can be accessed through a 17-bit instruction and stream address, although the exact size and format of the address can vary from implementation-to-implementation. Each bank can implement one or more of the following interfaces. The tile scratchpad memory 502 enqueues an access request in a per-bank load queue (not shown) in response to a received instruction to load or store and add to data in a bank and word specified by a received address or address range. For storing data, the tile scratchpad memory 502 enqueues an access request in a per-bank load queue from a receive store or store-add instruction. Each bank can also receive a read access from one or more external sources, such as from a DMA or stream request to read/write data. Example instructions to the tile scratchpad memories 502 include vector load and vector store instructions. These and other instructions can be specified in an ISA for the hardware circuit 101, defining instructions which cause the hardware circuit 101 to perform certain predetermined operations in response to receiving the instructions. Vector load instructions may be issued to a bank load queue. Similarly, a vector store instruction may be issued to a bank store queue. A vector store-add instruction may refer to a type of instruction which causes the hardware circuit 101 to perform a read-modifywrite operation at a target range of addresses within one or more banks of the tile scratchpad memories 502.

To handle prioritization of loads and store on the banks of the tile scratchpad memories, the store access at the head of a per-bank store queue may have the highest priority to access the write port of its respective bank (not shown in FIG. 5). The load access at the head of the per-bank load queue may have the highest priority to access the bank's read port. If the load is to the same address as a queued store, and the store was from an instruction bundle issued before the load, then the bank may read data from the store queue, instead, to load the data.

Accesses from a source external to the tile hosting a bank may undergo multi-level arbitration before the access is presented to the bank. For example, writes or adds from different sources may first undergo a per-bank least recently used (LRU) arbitration among themselves being enqueued in a target bank's per-bank write queue. The write queue may be 4-entry deep, as an example. Similarly, read access requests from different sources may also undergo LRU arbitration. The winning read request then may undergo a second-level arbitration with the read request originating from a stream add access and a load access to read the bank. A stream add access performs a read-modify-write operation, which is also enqueued into the per-bank write queue. If the head of the write queue for a bank is a stream add access, its read request can undergo a round-robin arbitration with the winning external read requests. The winning read request has the second-highest priority to the bank's read port, behind the load accesses. The write request at the head of the per-bank write queue may have the second-highest priority to the bank's write port, behind the store accesses. In case of no bank conflict, a bank can sustain the throughput of at least one stream add operation per cycle.

Each bank of a tile scratchpad memory 502 includes ports for reading and writing from and to the bank (not shown in FIG. 5). These ports can generate alerts for detecting starvation. External sources of read and write requests may become starved if the sources access a bank that is continuously accessed by loads, stores, or store-adds. The probability of starvation can be mitigated by specifying a maximum access of the total number of banks in a tile scratchpad memory 502, e.g., allowing access of only a maximum of eight out of thirty-two banks on a given clock cycle.

The alerts generated for starvation can be based on predetermined thresholds. For example, the predetermined thresholds can be a number of contiguous clock cycles during which an external source does not access the bank for a read or write request.

If read port starvation is detected by the bank in the tile scratchpad memory 502, then one or more actions can be performed by the scatter/gather engine. A hold issue can be executed if the bundle has load, store, or store-add instructions. Per-bank load and store queues may be drained normally. Hold issue may continue until a predetermined maximum number of read requests are serviced by the scatter-gather engine are serviced, or if the scatter-gather engine read queue becomes empty.

If write port starvation is detected by the bank in the tile scratchpad memory 502, then the following sequence is executed. Hold issue if the instruction bundle has store or store-add instruction. Each per-bank store queue is drained normally. Issue can continue to be held until a maximum threshold of held issue requests are serviced by the scatter-gather engine. The thresholds and cycle counts can be varied from implementation-to-implementation.

Sync flag memory 412 in some examples may be organized as four banks (not shown). Each entry may have 32 bits of data. Each bank in the sync flag memory 412 can perform cycle-by-cycle arbitration separately for the read and write ports among the following sources: scalar miscellaneous instructions have absolute priority. In some examples only one of the scalar miscellaneous instructions can be issued in any given cycle. Read-modify-write operations may be pipelined, and so, back-to-back read-modify-write operations to any location may be supported. After scalar miscellaneous instructions, DMA updates, Stream Updates, and Remote Writes may be combined onto a single (external) interface through round-robin arbitration and may have next highest priority. Accesses from a host to the hardware circuit 101 through a control status register have the lowest priority.

An access request to the banks can be from a number of sources. A core memory network read is a read access that goes out on the core memory network that can be originated by a DMA or stream request. The access request can be a core memory network write for write access from the core memory network that originates by the DMA or stream request. The access request can be from a stream address, e.g., the indirect address read from the local tile. The access request can be from an internal stream read or write.

Figure 6:
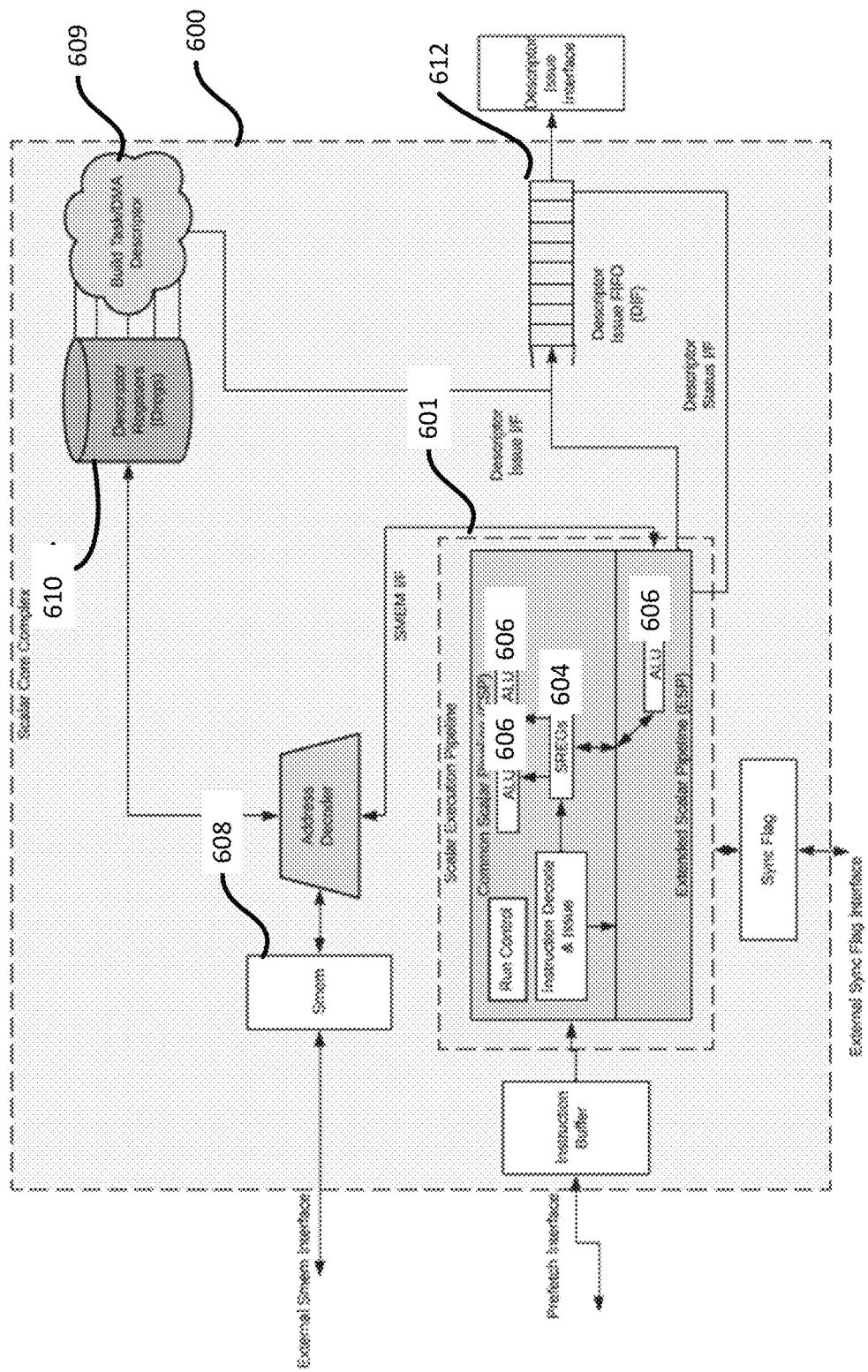
FIG. 6 is an example block diagram of a scalar core complex of a tile sequencer, according to aspects of the disclosure.

FIG. 6 is an example block diagram of a scalar core complex 600 of a tile sequencer, according to aspects of the disclosure. The scalar core complex can be a 32-bit scalar VLIW core. Scalar execution pipeline 601 can be one or more circuits configured for executing scalar and miscellaneous instructions, such as fetch, decode, and execute. The scalar core complex 600 executes instruction bundles that are prefetched. During execution, one bundle is fetched per block, as addressed by the next PC register. Each bundle can include two scalar instructions and one miscellaneous instruction that gets decoded and executed simultaneously.

The scalar execution pipeline 601 can include 32-bit computation units including registers 604 and ALUs 606. The computation units provide address calculation, loop control, and scalar operands used to construct descriptors. The complex 600 has a memory 608 that can be accessed through a load/store interface. The memory 608 is used by the complex 601 to store intermediate scalar values during execution of a program. The core type decides the depth of the memory 608, e.g., depending on whether it is part of the tile sequencer, or the TAC or TEC of a tile.

The complex 600 constructs descriptors 609 and can use descriptor scratchpad registers 610. If the instruction uses the descriptor scratchpad registers 610, at issue the complex 600 fetches N×32-bit words starting at the specified descriptor scratch register address in the instruction. The value of N depends on the specific descriptor type. The descriptors are then enqueued into descriptor issue FIFO 612.

Cross-Lane Processing Unit (XPU)

The following description and reference to figures describes example implementations of the XPU. Distributed embedding training is challenging to accelerate because effective acceleration relies on utilizing provisioned compute, available on-chip main memory bandwidth (HBM), and inter-chip communication bandwidth. Utilizing these computations is difficult because the computations are dynamic and irregular. Additionally, performance bottlenecks vary widely from model to model, and the problem space is rapidly evolving, with new algorithms, optimizers, model architectures, etc. Flexibility in expressing new algorithms and optimizing for different performance bottlenecks is critical.

Embeddings can be fed into a machine learning model, e.g., a neural network, for performing a machine learning task, e.g., a natural language processing task or other tasks which may benefit from the use of embeddings. Embedding layers are layers of a neural network trained to generate embeddings from an input. After generation, the embeddings can then be processed downstream, e.g., by later layers of the neural network implementing the embedding layers. Models with embedding layers pose unique computational challenges, for example due to low compute density, significant stress on memory bandwidth, and a large memory footprint. Further, for accelerating these types of models, there can be a wide variance in performance bottlenecks from one model to another.

An embedding function or map can be implemented, for example, as a lookup table, or as a sparse-vector, dense-matrix multiply. For example, an embedding function can be implemented as a matrix, which when multiplied by an input vector, generates a corresponding embedding for the input vector. For example, the input vector may be a bit vector representing the presence or absence of different natural language words in an input sentence to a machine learning model. The bit vector will generally be a sparse vector, e.g., less than fifty percent or more elements in the vector having zero values, as the bit vector will include elements for a large vocabulary of potential natural words that can form an input sentence. The output vector from multiplying an input vector with the embedding function matrix is the embedding representing the input sentence.

The embedding function may be a very large table, e.g., hundreds of gigabytes in size. As a result, the embedding function cannot fit in the main memory of a single accelerator or processor, therefore the embedding generation is distributed across multiple nodes, each with one or more accelerators. An embedding table may be partitioned across multiple devices, for example multiple accelerators in a pod of a datacenter.

The distribution creates complexity in processing these embedding layers implementing these embedding functions. Aspects of the disclosure provide for accelerating different operations for scattering, gathering, uniquifying, and summing different input values to facilitate the generation of embeddings for individual or batches of input samples. A large embedding table can be partitioned across multiple accelerators. For ease of description, the following description will focus on a single accelerator, e.g., the hardware circuit 101. Further, the examples provided herein will describe embedding for natural language processing tasks, such as machine translation, although it is understood that aspects of the disclosure can provide for acceleration any type of machine learning model at least partially relying on embedding generation for performing a respective machine learning task. Other examples include, for example recommendation systems, such as content recommendation systems seen in domains such as multimedia recommendation, search result ranking, and advertising.

Although examples are provided with regard to embedding generation, it is understood that the same primitive operations described herein can be assembled in a different manner to address other sparse problems, such as sparse matrix multiply. This flexibility allows for acceleration of a range of sparse problems. Sparse computation may be employed in other problem spaces besides machine learning and deep neural networks, such as scientific computing and/or graph analytics.

On the forward pass of a neural network processed according to one or more accelerators as described herein, the input can be a batch of one or more input samples. The input samples may be processed by the one or more accelerators performing operations of one or more embedding layers of the neural network. The output of the embedding layers is a batch of one or more embeddings, one for each sample in the input batch. Note that, although input samples share a common length, e.g., the number of potential features attributed to each input sample, the input samples may have a number of empty or zero-valued feature values.

On the forward pass, the input batch is partitioned across multiple different accelerators, for example across one or more host devices.

The input batch can be represented as two vectors, a vector of values and a vector of indices. The vector of values corresponds to values for each identifier in the input samples of the batch. The indices can refer to the position of the values for each identifier in a tensor representing the input batch. The input batch is partitioned, such that portions of the input batch are sent to different accelerators. Upon receiving the partitioned input batch, the accelerator can "uniquify" the input to remove duplicate identifiers across the input batch. Uniquifying the input refers to removing multiple instances of the same identifier. One reason for doing so is to reduce inter-chip network usage, preserving bandwidth by not making redundant accesses for the same identifier. Uniquification avoids redundant lookups on the embedding table. After uniquification, the uniquified input batch is distributed to devices with respective portions of the embedding table, for generating the output embedding. After scattering, the generated embeddings can be gathered from the various devices and returned to another device requesting the embeddings.

During training, gradients representing the rate of error between a ground-truth embedding and a predicted embedding can be similarly scattered to devices storing partitions of the embedding table, for updating the respective partitions.

Aspects of the disclosure are directed to an XPU for performing data-dependent operations across multiple data processing lanes of a processor. Rather than implementing physically fabricated operation-specific circuits for each data-dependent operation, the XPU can be configured to perform different operations in response to input signals configuring individual operations performed by processing cells and crossbars arranged as a stacked network in the XPU. The XPU operates across values of multiple SIMD data processing lanes. The XPU can be implemented as part of a co-processor complementing a second co-processor configured for SIMD parallel processing. The co-processor implementing the XPU can be configured to perform data-dependent operations.

Aspects of the disclosure provide for an XPU to first process the sparse data before passing the data to the co-processor downstream in the processing pipeline enables wider workloads for efficient computation than previously possible without the XPU. Because the XPU can handle a variety of data-dependent operations, processing pipelines and corresponding processors can be designed without the restriction of pre-defining input data for processing on existing SIMD architectures. Without the XPU, existing SIMD architectures are unable to efficiently accelerate data-dependent operations, such as embedding generation from a sparse collection of features to a machine learning model.

Example data-dependent operations include generating an embedding for an input training example. An embedding can be a vector, or some other data structure mapped from an input, which has a higher dimensionality than the embedding. Embedding generation can be performed as part of a workload processed according to a pipeline. As other examples, the XPU may perform vector scatter or gather operations, segment sums, and/or partition the sparse feature tensors. The XPU as described herein can be a complementary processing unit to other components of a processor or connected components, such as a vector processing unit built according to a SIMD parallel processing paradigm. One or more XPUs can be connected in respective processor cores of a larger processor, which itself may include other components for accelerating the performance of certain workloads, such as training neural networks.

Moreover, the XPU is not limited to performing a certain type of data-dependent operation, therefore a processor can be designed to include the XPU to complement other types of processing units for multiple different pipelines. Because the XPU can be configured on a per-workload basis, the physical footprint of the XPU is reduced versus other approaches in which specialized circuits are physically fabricated on a processor as complementary units for computation of sparse data. The functionality of the XPU can also be extended through the use of an instruction set or extension to an existing instruction set of the host processor, further improving the adaptability of different data-dependent operations as pipeline data receive changes. Instructions can be provided as signals to components of the XPU responsible for translating the instructions to configure the individual processing cells and crossbars of the XPU. The XPU can be configured using a program compiled by a corresponding compiler for the hardware circuit implementing the XPU.

The XPU includes a network of individual processing cells, each cell processing data that passes through one or more data processing lanes through crossbar connections between the processing cells. Each data processing lane can include one or more registers for temporarily storing data during processing. Each processing cell is configured to perform one or more primitive operations on multiple sets of operands. A first set of operands is provided as input from a data processing lane of the processor shared by the processing cell. A second set of operands is provided from a crossbar configured to coordinate data transmission across the multiple data processing lanes of the XPU.

The XPU can be divided into a number of pipeline stages, with each stage including a crossbar, one or more processing cells and a corresponding control cell for each processing cell. The number of stages can vary, for example based on the composed operation the XPU is configured to perform for a current workload.

The XPU performs a composed operation by performing multiple primitive operations across the pipeline stages of the stacked network of processing elements and crossbars. A composed operation is an operation performed on input by the XPU to generate an output. Primitive operations are operations that individual processing cells of the XPU are configured to perform, which when executed by the XPU, causes the XPU to perform the composed operation. Performing a composed operation may require performing other composed operations. For example, to perform a vector sort, the XPU may perform pre-fix summation, another operation composed of multiple primitive operations. Example primitive operations include operations for comparison, arithmetic, or bypassing input data. The XPU performs a composed operation by configuring each of multiple individual processing cells and crossbars arranged according to one of multiple pipeline stages for the XPU.

The primitive operations performed at each stage of the XPU can be programmatically defined and may vary from workload-to-workload. The primitive operation a processing cell is configured to perform is determined by one or more control signals or instructions received by a respective control cell for the processing cell. The exact primitive operations performed by the processing cell can depend on, for example, the composed operation the XPU is currently configured to perform. In other examples, processing cells in different lanes or different stages of the XPU can be configured to always perform one or more predetermined primitive operations. After the XPU generates an output, the output can be passed along multiple data processing lanes to another processing unit or memory unit of a processor implementing the XPU.

Two example composed operations that the XPU can execute are vector sort and vector duplicate count. Vector sort is an in-place, stable sort of (key, value) tuples of an input vector, sorted by key. Vector duplicate count returns a running duplicate count of values of the (key, values) tuples of the input vector. The XPU is configured to perform both vector sort and duplicate count according to the same configuration of processing cells and crossbars, as described herein. By using the same configuration, the XPU can perform both composed operations more efficiently, at least because the XPU does not have to be re-configured in between performing a vector sort and a vector duplicate count for a given input vector. Other composed operations that the XPU is configured to perform include parallel-prefix sum, vector partition, vector histogram, vector compact, vector permute, vector reduce, vector shift-insert, vector gather, vector scatter, etc. Performing a vector duplicate count allows for identifying the presence of duplicate values, which can be used to uniquify vector input and avoid redundant processing.

Aspects of the disclosure can provide for the following technical advantages. A hardware circuit implementing the XPU can provide for more flexible and programmable hardware for embedding-class workloads, and other data-dependent operations that are not efficiently parallelizable. The XPU provides an acceleration path for different classes of data-dependent operations on a workload-by-workload basis, without requiring that the XPU be fixed to perform only certain operations efficiently. By providing for a programmable unit as described herein, the implementing hardware circuit can robustly adapt to the demands of different workloads, complementing parallelizable data-independent SIMD operations, which otherwise may be inefficient or ineffective for workloads requiring data-dependent operations.

A hardware circuit, such as an application-specific integrated circuit, can be designed with different quantities of XPUs to further coordinate and distribute workloads at scale. The XPU as described herein also allows for efficient performance of multiple operations using the same configuration, further reducing processing time and configuration time. For instance, the XPU can be configured to perform both vector sorting and vector duplicate counting, instead of separate configurations of the XPU and/or separate instances of specialized circuits for accelerating those operations.

Figure 7:
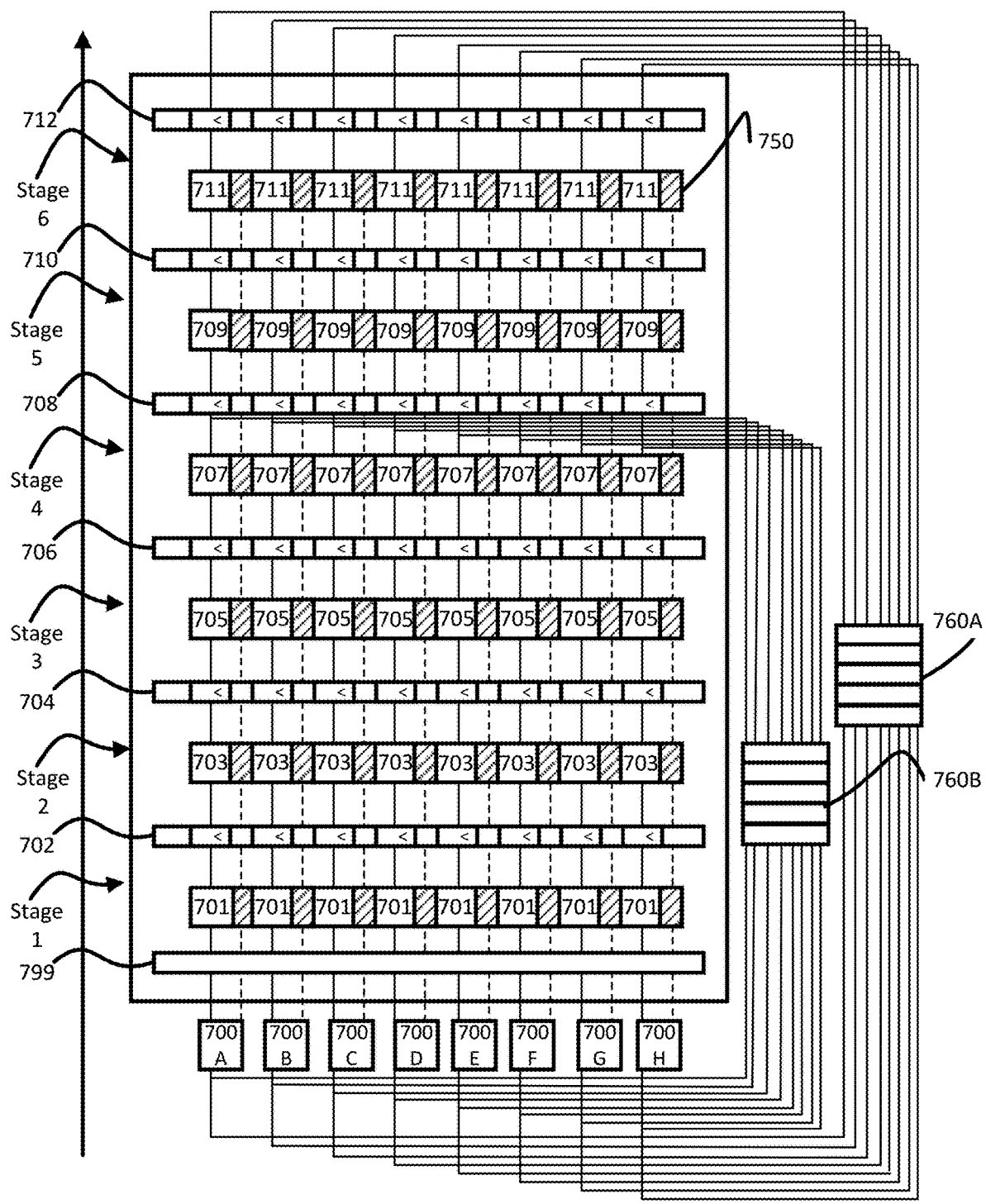
FIG. 7 is a block diagram of an example XPU, according to aspects of the disclosure.

FIG. 7 is a block diagram of an example XPU 700. The XPU 700 includes processing cells 701-709, crossbars 703-711, control cells 750 (represented by hatched blocks in block diagram of FIG. 7), Data flows from the bottom up along data processing lanes 700A-H, beginning at stage 1 and ending at stage 6. Stage 1 includes processing cells 701 and crossbar 702. Stage 2 includes processing cells 703 and crossbar 704. Stage 3 includes processing cells 705 and crossbar 706. Stage 4 includes processing cells 707 and crossbar 708. Stage 5 includes processing cells 709 and crossbar 711. Stage 6 includes processing cells 711 and crossbar 712. In different examples, an XPU can include more or fewer stages. The XPU can also include a crossbar 799.

Earlier stages are considered "upstream" to later stages, and later stages are considered "downstream" to earlier stages for purposes of description. For example, stage 1 is upstream to stage 5, stage 4 is downstream to stage 3.

The crossbar at each stage of the XPU can be any type of circuitry configured for permuting different input values from respective lanes to different other processing lanes according to the current configuration of the crossbar. The crossbar can receive one or more control signals from control cells for each processing cell in the same stage as the crossbar. The crossbar is configured to permute input values from each processing cell in the same stage according to a fixed pattern. The pattern depends on the composed operation the XPU is currently configured to perform and does not necessarily cause the crossbar to permute every processing cell output. In other words, some processing cell outputs may bypass the crossbar and proceed to the next stage along the same processing lane.

For configuring the processing cell, each processing cell of the XPU 700 has a respective control cell 750 configured to receive one or more control signals along a respective processing lane on which the processing cell resides. The processing cell is configured with circuitry to perform various different primitive operations and perform those operations in accordance with control signals or instructions received, as described in more detail with reference to FIG. 7. The control cell receives instructions along a data processing lane, for example as one or more signals interpretable by the control cell for determining which primitive operation its corresponding processing cell is to perform. The control cell can forward the control signal(s) to the processing cell, or process received instructions or signals and forward generated control signals that the processing cell is configured to receive for enabling or disabling the execution of specified primitive operations.

Processing cells can also be configured to bypass input data received from a respective processing lane for the processing cell. When bypassed, the input received is passed from the processing cell to the crossbar in the same stage as the processing cell, without modification. The input received from the crossbar of the previous stage by the bypassing processing cell can be tied to zero or ignored. The actual behavior of the bypassing processing cell can depend on the pipeline stage the cell is in, and/or the processing lane the processing cell is in. FIG. 7, described herein, shows an example processing cell configured to perform comparison, arithmetic, and/or bypass primitive operations.

The XPU 700 can be configured to receive instructions defined as part of an instruction set architecture or an extension to the instruction set architecture of which the processor implementing the XPU 700 is configured to apply and execute. The instructions can specify different composed and/or primitive operations the XPU and individual processing cells are configured to execute as corresponding operations, respectively. Control cells 750 are configured to receive data representing instructions defined as part of the instruction set or extension and/or convert the instructions into control signals for configuring corresponding processing cells. For example, control cells 750 can receive signals as opcodes—code words for operations the XPU is configured to perform—of an instruction set corresponding to the processor or hardware circuit implementing the XPU 700. If the XPU 700 receives instructions for performing composed operations, such as vector sorting or vector duplicate counting, the XPU 700 can configure each processing cell to perform a predetermined respective primitive operation that causes the XPU to perform the instructed composed operation.

Operations performed by the XPU can be synchronized by clock cycle. For example, operations performed by processing cells in each stage can be performed in one or more cycles. For example, operations in each stage can be performed in a single cycle. Different composed operations performed by the XPU can take different amounts of clock cycles to perform. For example, vector sorting can be performed by the XPU in six cycles, vector prefix summation in four cycles, and vector compact in two cycles.

As described in more detail with respect to FIG. 7, processing cells can be configured for performing arithmetic operations, such as addition between operands of different types, including floating-point values and signed or unsigned integers. Arithmetic operations such as addition may form part of composed operations performed by the XPU for scanning operations.

Example instructions include instructions for resetting the XPU and retrieving information about the clock synchronizing and primitive operations performed by the XPU. Other instructions include instructions for retrieving one or more both operands, mask values, and/or segment markers from each processing lane. The instructions can include instructions for accessing a data structure stored by the XPU with control information specifying each of a variety of different composed operations supported by the XPU. In yet further examples, the instructions can include instructions for causing the XPU to push data to various registers, latches, or flip-flops, and determining whether the contents of the aforementioned are valid. The pushed data can include, for example, values being processed as part of performing a composed operation, and/or mask values.

A configured XPU 700 is said to implement a processing network for performing a particular composed operation. For example, the XPU 700 includes 48 XPU cells, which can be configured as follows: 18 cells can be configured for arithmetic operations, 38 cells are configured for comparing input values (one cell may be configured for both arithmetic and comparison operations), and 10 cells are configured to bypass input. In response to new instructions, the XPU 700 can reconfigure itself with a new processing network, to perform a different composed operation.

The XPU can be configured to operate in a variety of different operating modes, which can be specified as different instructions in an instruction set or extension. The different operating modes can include different composed operations for sorting, counting duplicates, scanning, partitioning the data, and/or identifying unique values in data input to the XPU. Further, the instructions can include operands specifying the type of comparison or arithmetic operation to perform, for example unsigned integer comparison for sorting or scanning, or floating-point addition. Other operands to instructions for performing composed operations include specifying from which processing lane the output of the composed operation is to emerge from the XPU 700. Other operands received can include segment markers for performing composed operations on segments of the input data, for example for sorting each of multiple segments of data received by the XPU 700 across the data processing lanes.

When performing vector sort and/or vector duplicate count, the XPU 700 is configured to include an odd/even merge network, and a value shuffle network. The network configurations include one or more stages of the XPU, with respective cells and crossbars of each stage configured to perform one or more primitive operations.

The XPU 700 can include register files 760A and 760B. The register files 760A-B can be coupled to the data processing lanes 700A-H between different stages and used to store and retrieve data. For example, some data may be stored in register file 760B after the processing cells 707 in stage 4, while data output by the XPU 700 is stored in register file 760A.

Stream Instructions and Ordering

Aspects of the disclosure provide for a hardware or software interface for asynchronous data movement between an off-core memory and a core-local memory, the movement between memories referred to as a "stream transfer." A stream transfer can include a stream descriptor that allows software to express common data-movement patterns, such as ones seen in sparse workloads. The data can be referred to as stream or a data stream. Stream transfers can be initiated by stream instructions. Stream instructions can encode information necessary for execution of the stream transfer. Each stream may have an associated stream identifier (ID) indicated by a data synchronization flag ("sync flag") associated with the stream instructions. The stream instructions issued by a core with the same stream ID can at least partially form a single stream.

A stream descriptor is an internal data structure that can represent information necessary for execution of the stream transfer. For example, the information can include control information such as a source address, a destination address, a stream operation code, and linear or circular buffers.

The stream transfer may only move data to or from a core-local memory. Further, core-local sync flags may be used to track the progress of a stream. The sync flags can track partial progress of a stream transfer. For example, depending on whether the flags are cleared or set according to a predetermined configuration, the sync flags track reads from core-local memory when the core-local memory is the source, or track writes to a core-local memory when the core-local memory is the destination. The progress of reads and writes to off-core memory may not be tracked, but to ensure that outstanding writes to off-core memory are committed, scalar fence instructions can be used to allow selection of what memory accesses to barrier.

The stream transfer may include indirect scatter-gather memory accesses on either off-core or core-local memory. The address to the source or destination of the access can be stored in another memory location relative to the address that is read first. As an example, indirect addresses are sourced from a register file along with masking support, or sourced from memory. The indirect scatter-gather memory accesses may further include different addressing modes, such as row-address or word-address, as examples. The stream transfer may include support for a ScatterAdd/GatherAdd mode directly on a memory word. The memory word may be updated atomically. As examples, 32-bit floating point, 32-bit integer, 16-bit floating point, and 16-bit integer data types can be supported.

The stream transfer may include support for circular buffers in a source or destination buffer, which can simplify buffer allocation issues for software as buffer sizes are not known during software compilation.

Further generally disclosed herein is a stream ordering model. Synchronization primitives for these transfers allow the data transfer to be treated in-order while the real data transfer is out-of-order. Discrete stream instructions issued by a core that have the same stream ID form a single stream. Hardware provides for ordering guarantees for transfers within a single stream, which can span multiple stream instructions.

The stream instructions that belong to a stream are processed in-order. For indirect stream instructions, an offset list is ordered. For example, the offset elements in the offset list are processed in-order. Writes are issued in-order to destination memory and can be committed by the destination memory out-of-order. Reads are issued in-order to source memory and can be serviced by the source memory out-of-order.

A sync flag is updated to indicate monotonic incremental progress for the stream. If a core-local memory is the source, then the sync flag tracks the reads relative to the core-local memory. A sync flag value of N when the core-local memory is the source of a read indicates that the first N chunks of data can be overwritten in the core-local memory, where a chunk of data is a predetermined unit of size for measuring data in the core-local memory. If the core-local memory is the destination, then writes to the core-local memory are tracked by the sync flag. A sync flag value N in the example in which the core-local memory is the destination indicates that subsequent reads to the first N chunks of data in the core-local memory will return the requested data.

The stream can end when the data for the requests preceding and including the last stream descriptor is fully committed to memory. As an example, if the core-local memory is the source, the stream can end when all reads have completed. If the core-local memory is the destination, the stream can end when all writes have been committed.

Aspects of the disclosure allow for software to express common data-movement patterns, specifically ones seen in sparse workloads, more efficiently. Aspects of the disclosure can also provide for a complexity-effective solution to hide long memory access latency while keeping the compute core and software programming model of an in-order core.

Stream transfers allow the tiles 102 and the tile sequencer 106 to move data between tile-local memory, such as memory 306 or scalar memory 334, and off-tile memory, such as memory 105 or high bandwidth memory 107. Tile-local memory is an example of core-local memory, as memory physically local to the sparse accelerator 103, such as memory 306 scalar memory 334. Off-tile memory is an example of off-core memory, as memory physically remote to TEC 330 or TAC 332 can include the memory 105 and/or the high bandwidth memory 107. Each stream has an associated stream ID which is indicated by the sync flag 318 associated with the stream instruction. Discrete stream instructions with the same stream ID form a single stream with the shared stream ID.

Stream transfers can move data to or from the tile-local memory. Tile-local sync flags 318 are used to track the progress of a stream. The sync flag 318 tracks partial progress of streams being transferred to and from different memories and through the tile 102. For example, the sync flag 318 tracks read operations (or "reads") from the tile-local memory when the tile-local memory is the source, or the sync flag 318 tracks write operations (or "writes") to the tile-local memory when the tile-local memory is the destination. The progress of reads and writes to off-tile memories may not be tracked. To ensure that all outstanding writes to the off-tile memory are committed, scalar fence instructions can be used to allow selection of what memory accesses to barrier. Scatter-gather engine 322 tracks the status of the issued stream transfers for each specific memory and communicates this status to the scalar core 320. When a scalar fence is issued to barrier on a particular memory, the scatter-gather engine 322 waits for the status to indicate all the outstanding stream transfers targeting that memory (read or a write) are fully committed. Once that condition is met, the fence wait is released on the scalar core 320.

Stream transfers can support efficient scatter-gather operations with a strided stream to access off-tile memories and an indirect stream to access off-tile memories from the tile-local memory or a register file. Whether strided stream or indirect stream can be based on a software access pattern. If the software wants to access every Nth element in a tensor, then a strided stream is preferable, though an indirect stream can still work. However, if the software wants to access a random set of elements in a tensor, then an indirect stream should be used. Stream transfers can also support circular buffer semantics on the tile-local memory.

Stream transfers support the following data movements where granularity and alignment of the data movement is dependent on the source-destination pair of memories. Data can be transferred from the memory 306 to the on-chip memory 105 as well as from the on-chip memory 105 to the memory 306. Data can further be transferred from the memory 306 to a high-bandwidth off-chip memory 107 as well as from the off-chip memory 107 to the memory 306. Data can also be transferred from scalar memory 334 to the on-chip memory 105 as well as from the on-chip memory 105 to the scalar memory 334. As an example, minimum granularity, source alignment, and destination alignment can be 4 bytes. As another example, 32-byte accesses can be used to support 4-byte accesses to the off-chip memory 107. As yet another example, a 32-byte alignment and a minimum length of 128 bytes can ensure performance on stream to or from the off-chip memory 107.

Each tile in the processor can implement a respective scatter-gather engine (SGE) to orchestrate the movement of data from the tile to the scratchpad memory, and/or the movement of data between different memories. These different memories can include scratchpad memory, off-tile memory, including high-bandwidth memory, and on-tile memory. An SGE can support multiple outstanding stream requests, which may originate from one or both of the TEC and the TAC of the tile implementing the SGE. Requests to read data can be treated as gather operations by the SGE, while requests to write data can be treated as scatter operations. An SGE can also be implemented in the tile sequencer, for handling reads and writes to a data stream between the sequencer and tiles and/or memories.

Figure 8:
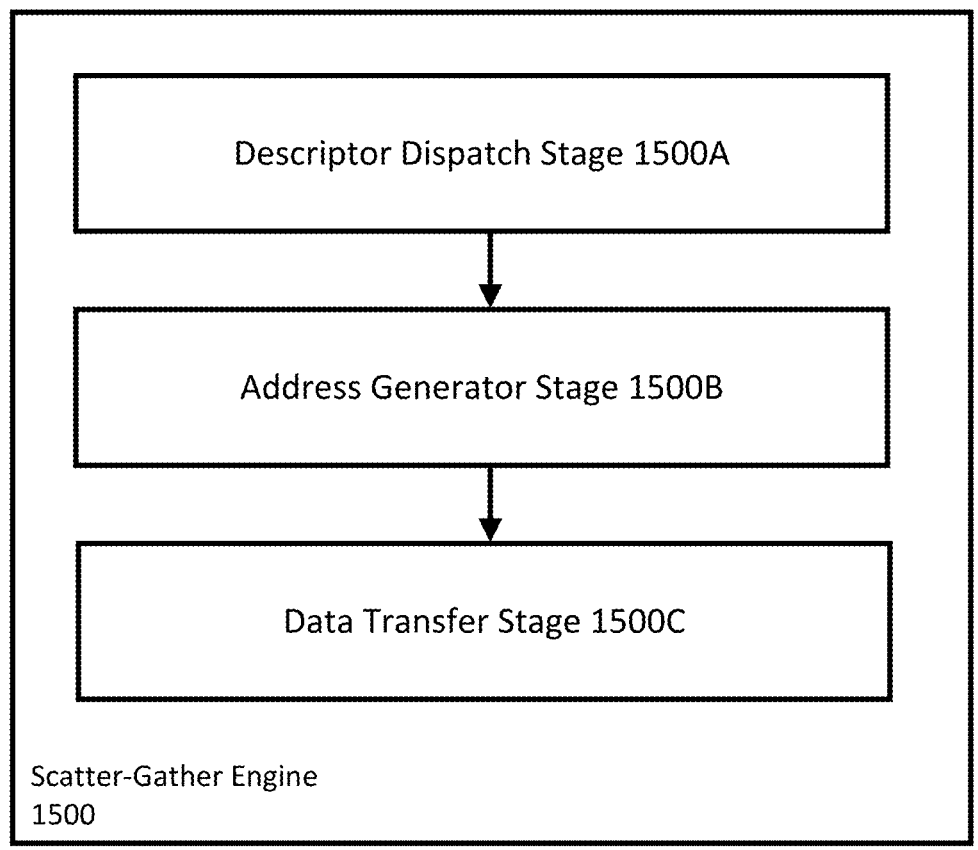
FIG. 8 is an example functional diagram of a scatter-gather engine, according to aspects of the disclosure.

FIG. 8 is an example functional diagram of a scatter-gather engine 1500. The SGE 1500 can support different numbers of execution threads, e.g., eight threads. Threads can be selected based on a stream identifier for an incoming request and the availability of an address generator thread and stream type, e.g., high-bandwidth memory and/or scratchpad memory. In some examples, a stream request with a stream identifier that is in flight in the address generator thread needs to be mapped to that same thread.

The SGE 1500 can enforce ordering guarantees for certain requests of the same type, e.g., gather requests or scatter requests, across multiple streams targeting the same external interface, e.g., the crossbar or other interconnect of the processor, that belong to the same stream and originate from the same tile core. The requests can be identified as belonging to the same stream if they have the same stream identifier. Sync flags managed on the tiles can be used for tracking ordering among requests as described here.

The SGE 1500 receives scatter/gather requests, unrolls the requests, moves data either on the processor interconnect to remote Spmem slices, or the core memory network CMN to high-bandwidth memory, and sends sync flag updates to the tile sync flag memory of one of the cores to update it of the progress of the transaction.

The SGE 1500 also services incoming DMA requests from the CMN interface to write to and read from the Tile Spmem slice and handles the reads and writes originated by a remote tile's SGE that target the Spmem slice local to this tile.

A stream request can be one of multiple different types. Stream requests can include scatter/gather requests from the cores of the tiles, which can be processed by a scatter-gather engine, which itself may be implemented on a tile and/or on the tile sequencer. One type of stream request is a linear request, in which the SGE can unroll the request into multiple smaller requests, based on the length of the stream request. Another type of stream request is a strided request, in which the SGE unrolls the request into multiple requests based on the stride and the length. Another type of stream request is an indirect request, in which the SGE unrolls a list of addresses of the same length, which are unrolled into separate requests. Another type of stream request is an indirect request, in which the SGE receives a list of addresses.

The SGE 1500 can implement a number of stages, e.g., the descriptor dispatch stage 1500A, the address generator stage 1500B, and the data transfer stage 1500C. Each stage is described in turn.

The SGE can interface directly with a descriptor generator in each tile core, e.g., the TAC and the TEC. The descriptor generator is configured to enqueue stream descriptors generated by the cores. Stream descriptors can be sent to the descriptor generator where metadata related to the descriptor is enqueued into the descriptor issue FIFO, with the actual descriptor being written to a descriptor RAM. The contents of the FIFO can include the pointer in the descriptor RAM where the descriptor resides, the memory type, and the stream identifier attached to the corresponding stream. When valid stream descriptor metadata is available at the head of either the TAC or TEC FIFO, the following sequence may occur.

First, the SGE may perform resource checks on each core's metadata. Next, the SGE can perform least recently-used arbitration to select between the two cores, assuming both have the required resources as determined by the resource check. If only one of the cores has the resources needed, this will be the next core to get serviced. The stream identifier attached to the metadata is looked up in a stream identifier to an address generator map and the associated counter is incremented, or a new entry is created in the map to select the address generator thread in the address generator stage to send the descriptor to. The metadata is then queued into a descriptor metadata queue associated with the selected thread. Resource checks can be performed in the descriptor FIFO associated with a descriptor metadata queue. Least-recently used arbitration selects one of the descriptor metadata queues, with the winning entry popped and its metadata forwarded to the descriptor RAM request FIFO. The request is popped and sent to the descriptor RAM and the data response stored in the descriptor FIFO to be forward to the address generator stage.

The stream identifier to address generator map figures out the address generator thread in the address generator stage 1500B to send the descriptor metadata to and is used to maintain ordering guarantees between subsequent stream requests that belong to the same stream. This structure can hold: the active stream identifiers, the address generator thread they are mapped to, a bit indicating the mapped stream identifier to thread identifier entry is valid, and a count of the number of descriptor belonging to this stream in the pipeline from the queue of the Stream FIFO.

The structure can be sized to hold different maximum stream identifiers, e.g., 16. Whenever a stream descriptor is issued with a currently inactive stream identifier, space available in the descriptor metadata queues, and/or space available in the stream identifier to address generator map, the SGE 1500 can perform one or more actions. The SGE picks the next available thread, and stores this value in the stream identifier to address generator map, and increments the counter associated with this thread by one. Any subsequent results to the same stream will now be sent to the same address generator thread and will increment the counter.

If there is no space available for this request in the Descriptor Metadata Queue of that address generator thread, or no space to allocate a new entry in the Stream identifier to Address Generator Map (if this is a new Stream identifier), or the counter in the map is almost full, the FIFO will not be dequeued until space opens up in all the required resources. This check is done prior to the arbitration between the two core FIFOs.

Across the address generator thread in the Address Generator Stage, 4 are associated with the CMN interface and the other 2 with the SC Data Crossbar. CMN interface address generator threads unroll requests targeting HBM while the SC Data Crossbar interface address generator threads target remote Spmem or Tile Spmem N. To determine the next available thread to store with the Stream ID, the stream interface metadata determines which address generator threads to select from and LRU arbitration is used across the associated threads that also have space in their corresponding Descriptor Metadata Queue.

Once the stream request has been unrolled by an address generator thread in the Address Generator Stage and the Sync Flag Tracking structure in the Data Transfer Stage has been updated, the counter in the Stream identifier to Address Generator Map can be decremented. Decrement updates to this counter from the Data Transfer Stage come from four parts of the data transfer pipeline: Stream scatters to core memory network (×1); Stream gathers to core memory network (×1); Stream scatters to processor data crossbar (×2); Stream gathers to processor data crossbar (×2). This is done by the last request to be unrolled in the descriptor by the address generator thread.

Once the counter associated with the Stream identifier in the Stream identifier to Address Generator Map becomes zero, this map entry can be invalidated, and any subsequent requests to the same stream can be re-mapped to any of available address generator thread for that interface (CMN/data crossbar) since it will eventually land up in the same Sync Flag Tracking structure which is maintaining the order between them.

For example, a Stream ID is initially mapped to thread_id #2 for a window of time when descriptors are in flight (until the Data Transfer Stage). The mapped entry will be invalidated if no more new descriptors are created with the same Stream ID for a while (the associated counter becomes zero). After the invalidation of the mapped entry, when a new descriptor is now created with the same Stream ID, the new map that is created can have the Stream ID mapping thread_id #1 and not have it be an issue because space has already been allocated in the Sync Flag Tracking structure in the Data Transfer Stage which is responsible for maintaining ordering. Note that this assumes that thread_id #1 and #2 belong to the same stream interface type (CMN/data crossbar) and are tracking updates to the same memory (scatter vs gather).

Not all information from the Stream FIFO needs to be enqueued to the Descriptor Metadata Queues since some of it is only used in the early part of the descriptor dispatch stage 1500A. Only the address to the descriptor ram is required in the later part of the stage to send out a read to the descriptor ram. All other metadata being carried in the FIFO is only used to map the descriptor to a specific address generator. After this point, this metadata can be discarded. The Descriptor Metadata Queues only carry a pointer to the descriptor ram.

At the output of the Descriptor Metadata Queues, there is LRU arbitration across all the address generator threads to get access to the descriptor RAM to maintain fairness.

Turning to the address generator stage 1500B, the descriptor from the descriptor FIFO is popped by the stream descriptor manager logic in the address generator stage and then passed on to the address unroll state machine for further unrolling into requests to remote memories. Each sub-block of the address generator is described in further detail below.

The stream descriptor manager logic is a state machine that unrolls address lists of indirect streams before passing on the descriptors to the address unroll state machine. Note that even though this specification describes the logic in the form of a state machine, the actual implementation does not explicitly label the states as such. This was done to simplify the code structure. However, the actual function performed by the logic does not change and is the same as what is described here. It does the following tasks in each state.

Idle state: In this state, the logic pops from the descriptor data FIFO and checks the off tile_stream_type field of the descriptor. In the unroll address list state, this state is reached only, for example, if there are more than 4× addresses to unroll in the address list of an indirect stream.

The address unroll state machine is used to unroll each stream descriptor presented to it into one or more read/write requests to the core memory network interface (headed to HBM) or to the data crossbar interface (headed to remote Spmem).

Note that the address unroll state machine must indicate to the data transfer stage the stream scatter or gather that is the last request that is unrolled from each stream descriptor. This information is passed on from the stream descriptor manager logic to the address unroll state machine as part of the descriptor metadata by indicating the last entry in the address unroll input FIFO related to a specific stream descriptor. This information is required by the data transfer stage to track descriptor "committed" and "retired" states for fence instructions.

In the data transfer stage 1500C, the SGE 1500 deals with the formatting of the outgoing stream scatters and gathers to match the interface requirements of the CMN and the data crossbar. It manages DMA access to the Spmem and sync flag tracking for outstanding stream gathers and scatters. This pipeline stage also services the incoming read and write accesses from remote tiles.

The SGE 1500 Increments transaction counters for tracking status of fence instruction based on the source core ID and the target remote memory. For fence, there can be, for example, 6 counters per core type [12 in total]-Spmem (write retired, write committed, read retired), HBM (write retired, write committed, read retired). Each transaction that wins arbitration into the data transfer stage will increment both the retired and committed counter of the associated memory and core type.

The SGE 1500 sends a decrement to the descriptor dispatch stage for the fence descriptor counters present there, if this is the last transaction associated with the descriptor being unrolled. This can also be done for the first transfer associated with the descriptor as well but since the "last transfer" status is already available, no extra information needs to be tracked if the decrement is done based on the last transfer. This also ensures that a wrong status is not provided to the core complex. The decrements are performed in the granularity for the following interface transfers.

The SGE 1500 sends a decrement to the descriptor dispatch stage for the sync flag id to address generator map if this is the last transaction associated with the descriptor being unrolled.

The descriptor committed state for stream gathers is the same as the descriptor retired state and therefore stream gathers need to be tracked by only one type of state counter. In case of stream scatters, the two counters will be updated at different points in the flow. Also, since the granularity of updates in the pipeline that updates sync flags can be different from the granularity in which requests are tracked to remote memory, the logic needs to maintain state at these two different parts of the data transfer stage.

The data transfer stage 1500C maintains a counter per source core per remote memory type that is incremented by each instance of sync flag tracking logic. The counter is incremented when a sync flag message is enqueued to the message router interface by the sync flag tracker. The sync flag update sent to the message router has the remote memory and the source core associated with the transaction that the update belongs to which is sent back to the SGE once the sync flag update is completed to decrement these counters in the data transfer stage.

Each sync flag tracker also maintains status of whether there is any live transaction being tracked by it (per source core per memory type).

As long as there is anything "live" in the sync flag tracker for stream scatters to a particular interface, all descriptors to that memory type haven't yet been "committed" or "retired". Note that if the stream scatter "retired" counter for a particular memory type is 0 but the associated sync flag tracker still has "live" transactions, then the fence status for that memory will still show that not everything is "committed" OR "retired".

For stream gathers, even if the "retired" counters have all been decremented the current status to the descriptor dispatch stage cannot be set to "committed" or "retired" as long as there are "live" transactions in the sync flag tracker. Once the sync flag tracker for the specific memory reports that nothing is being tracked there, the status can be updated to the descriptor dispatch stage.

The descriptor tracking logic in the data transfer stage 1500C sets the live fence status to the descriptor dispatch stage 1500A.

As described herein, the SGE 1500 can be implemented as part of the tile sequencer, as well as in each tile. The Scatter Gather Engine in the tile sequencer will be a parameterized version of the SGE subsystem described above with some differences that are elaborated in this section. The "local" memory in the case of the tile sequencer is always shared memory which has a lower read/write bandwidth requirement compared to the scratchpad memory.

The stream descriptor is a data structure that can represent all information for the scatter-gather engine 322 to execute a stream transfer. Stream instructions can fully encode fields for the stream descriptor. The following are example fields for the stream descriptor.

For a stream operation code, a gather stream reads an off-tile memory and stores the data to, or adds the data to, a tile-local memory. A scatter stream reads from a tile-local memory and stores the data to, or adds the data to, an off-tile memory. The off-tile memory and tile-local memory is determined by fields such as off-tile memory type and tile-local memory type, respectively.

An add variant of the stream instructions can support both floating point and signed integer addition operations. Gather signed-integer addition and gather floating-point addition variants can be supported for tile-local memory. Scatter signed-integer addition and scatter floating-point addition variants can be supported for off-tile memory and tile-local memory. If an illegal combination is detected, a program error can be raised by the engine.

The tile local stream type indicates the address pattern used for accessing the tile-local memory. For example, a linear stream facilitates a number of contiguous words starting at a tile-local start offset. The number of contiguous words can have a 4-byte length. As another example, a circular buffer stream allows software to build logical circular buffers in tile-local memory. In this example access pattern, the base, size, and offset fields in circular buffer metadata are used to generate addresses for a number of words. The number of words can have a 4-byte length. A program error can be raised if an effective length in granularity is greater than a size field in the circular buffer metadata.

The off-tile stream type indicates the address pattern used for accessing the off-tile memory. Linear stream facilitates accessing a number of contiguous locations starting at the off-tile start offset. The actual word size depends on the off-tile memory type. Strided stream facilitates converting a strided access pattern into a multi-dimensional array stored in the off-tile memory type. Stream transfers can support a single level of stride. Indirect streams enable random scatter-gather access patterns into a table. An indirect offset list is used here, where each entry in the list accesses the same length of data.

The source of the indirect offset list can be tile-local memory or a register file. If the source is the tile-local memory, the indirect offset field has a start offset into the tile-local memory where a number of offsets are stored. If the source is the register file, the indirect offset field has the register file and a number of lanes that contain valid offsets are indicated. These offsets are used to perform the scatter or gather operation as indicated by the stream operation code.

A core type indicates the type of core in the tile 102 that generated the stream descriptor, such as the tile executor core 330 or the tile access core 332. A sync flag core type indicates the core type of the sync flag 318 that tracks the progress of the stream. The encoding can be the same as the core type to allow streams initiated by the tile access core to be tracked by the tile executor core as well as the tile executor core to be tracked by the tile access core.

A sync flag ID indicates an offset within the target sync flag memory. The sync flag ID can also be used as a stream ID and can have ordering guarantees, to be described further below. A set done bit indicates that the current descriptor is the last in the stream. The done bit is set after all the data for the current descriptor and the preceding descriptors in the stream are fully committed to the tile-local memory.

A sync flag count type indicates the type of count the sync flag 318 is tracking, whether number of word or number of descriptors. In both cases, the sync flag 318 tracks the monotonic incremental progress for the stream, but at different granularity.

The tile local memory type indicates the type of tile-local memory participating in the stream transfer, which can include the scalar memory 334 or local banks of memory 306.

A tile local start offset field is used if the tile local stream type is linear. It indicates an aligned start offset word, such as a 4-byte word, within the tile-local memory that is accessed by this transfer. The actual access type depends on the stream operation code.

The tile local stride encodes the stride size and number of bytes accessed in each stride, which is used to access the tile-local memory selected by the tile local memory type. Length, which can be in 4-bytes as an example, does not need to be a multiple of the number of bytes accessed in each stride. The last request of the strided access would access the remaining words of transfer which might be less the length per stride. The stride calculation can be the same for both linear and circular buffer stream types.

A circular buffer metadata field is used if the tile local stream type is a circular buffer. The size of the circular buffer can be a multiple of granularity of the off-tile memory type and the offsets can be aligned. If the circular buffer wraps around, requests are broken into multiple requests, and an error can be raised if the resulting requests are not a multiple of the granularity of the off-tile memory type. An error can also be raised if the total length of the stream transfer is greater than the size of the circular buffer.

An off-tile memory type indicates the type of off-tile memory participating in the transfer. This includes the on-chip memory 105 as well as the high bandwidth memory 107. A high-bandwidth memory view that allows access at 4-byte granularity and 4-byte alignment can also be used. If the sequencer 106 is the initiator of the stream transfer, then this field may not have the high bandwidth memory 107 encoded.

A tile ID field can be used to select a tile ID for a memory slice. An off-tile start offset includes a start offset word within the off-time memory 105 indicated by the associated off-tile memory type. The unit of offset can be equal to the values indicated in the offset alignment column in the off-tile memory type. For example, for a high bandwidth memory 107, an offset value of 1 would translate to byte address 32. If the off-tile stream type is indirect, then this field can act as a base address that is added to the offsets read from the indirect offset list before accessing the memory.

An indirect offset can be used if the off-tile stream type is indirect. If the source is tile-local memory, the indirect offset provides the word start offset in the tile-local memory that stores the indirect offset list. If the source is a register file, the indirect offset provides the file register index that sources the indirect offset list. The register file can be read at the time of the stream instructions being issued.

An indirect list size can be used if the off-tile stream type is indirect. If the source is tile-local memory, the number of elements in the offset list is stored in the tile-local memory. If the source is a register file, the number of lanes that contain valid offsets is stored. The completion of the transfer is kept in-order with the rest of the descriptors in the stream.

An indirect list type can be used if the off-tile stream type is indirect and indicates the type of offsets stored in the offset list. This can include a word offset and a row offset. An indirect list stride is used if the off-tile stream type is indirect and indicates the distance between two address words in the offset list stored in the tile-local memory. This can be a signed integer.

An indirect filter field is used if the off-tile stream type is indirect and if this field is set, then an indirect memory address matching the indirect filter value is filtered out. The indirect filter value indicates the value of the element in the indirect access list that needs to be filtered out. The value is the type indicated by the indirect list type. Filtering can be enabled if the indirect filter field is set for an indirect stream and/or the value of the element in the indirect offset list matches this field. The off-tile and tile-local accesses corresponding to the filtered element are dropped but the tile-local buffer will still be advanced by the size of the filtered access.

A length, such as a length in multiples of 4-bytes or 512 bytes, as examples, indicates the total number of words that are accessed by the stream. If the off-tile stream type is linear or strided, this field indicates the total number of words that are accessed by the stream. If the off-tile stream type is indirect, this field indicates the number of words that are accessed from each address in the indirect offset list. A program error can be raised if the actual value of this field is not a multiple of the granularity of the off-tile memory type. A program error can also be raised if the generated address exceeds the bounds of the off-tile memory 105.

A stride size field indicates stride size in units of granularity of the off-tile memory type. This can be a signed integer. A length per stride, such as a length per stride in multiples of 4-bytes or 512 bytes, as examples, indicates the number of words accessed in each stride. This is a signed field but should contain non-negative values. The length does not have to be multiple of this field. This field should be a multiple of the granularity of the off-tile memory type selected by this stream descriptor. The last request of the strided access would access the remaining words of transfer which can be less than the length per stride. A program error can be raised if the length per stride is 0, negative, or not a multiple of off-tile memory access granularity. A program error can also be raised if the generated address exceeds the bounds of the off-tile memory 105.

A trace field indicates whether the stream transfer should be traced. Tracing can include logging information about the actions taken during the stream transfer as part of debugging.

Figure 9:
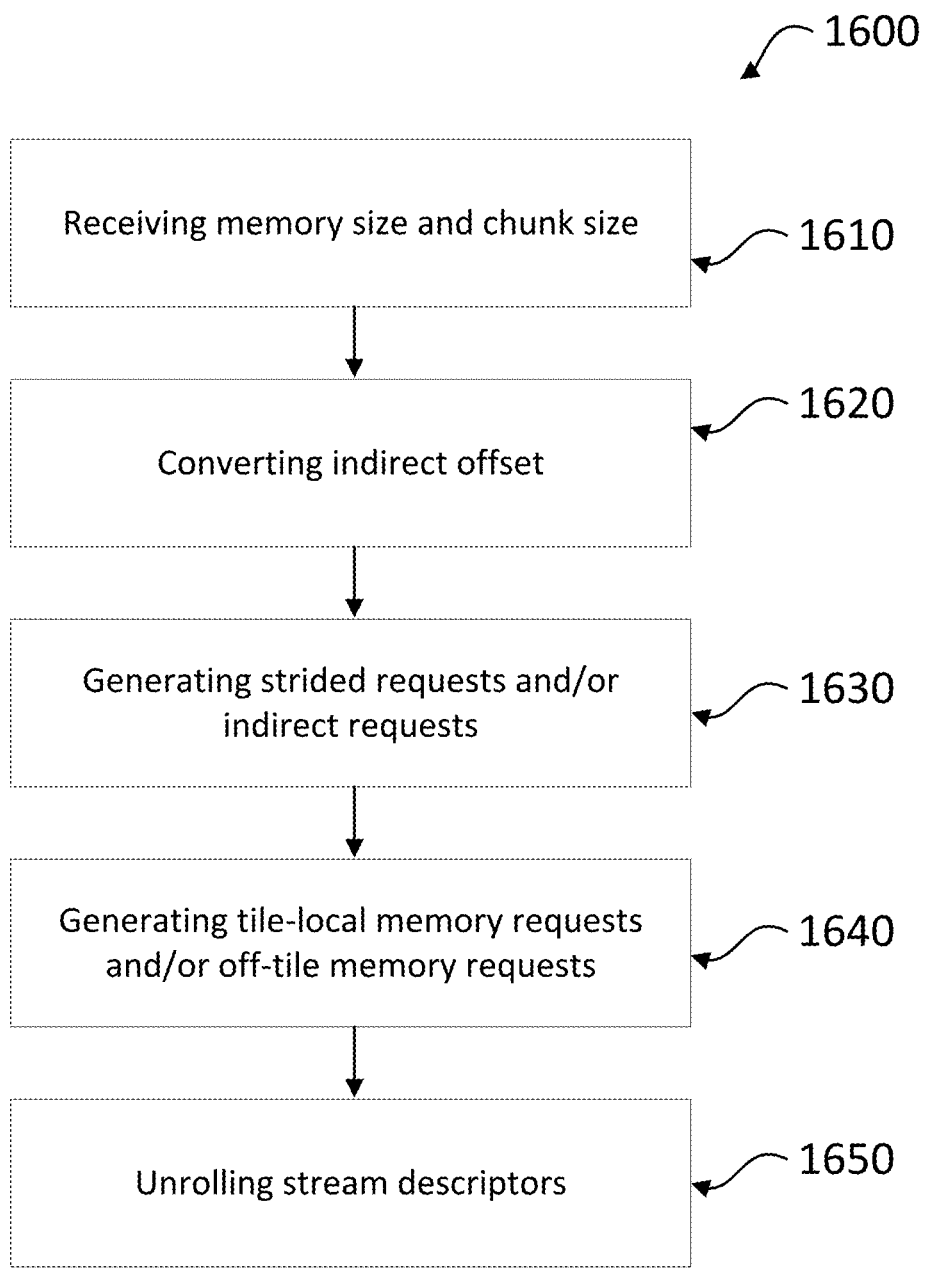
FIG. 9 is a flow diagram of an example process for unrolling a stream descriptor into a constituent off-tile stream request or tile-local stream request, according to aspects of the disclosure.

FIG. 9 is a flow diagram of an example process 1600 for unrolling a stream descriptor into a constituent off-tile stream request or tile-local stream request. The example process 1600 can be performed on a system of one or more processors in one or more locations. For example, the hardware circuit 101, as described above, can perform the process 1600.

As shown in block 1610, the process includes receiving the size of the off-tile memory, such as receiving the size in 4-bytes. Further, the process includes receiving a maximum chunk size of a stream request targeting an off-tile memory type. As shown in block 1620, the process further includes converting the indirect offset read from the file register or tile-local memory to an offset, such as a 4-byte offset, into the off-tile memory based on the indirect list type.

As shown in block 1630, the process also includes generating strided and/or indirect requests. For strided requests, the process can include partially unrolling the strided stream descriptor into a set of requests that each access consecutive addresses in the off-tile memory. For indirect tile-local memory requests, the process can include taking an indirect stream descriptor and generating a list of offsets into the off-tile memory type selected by the descriptor. For indirect file register memory requests, the process can include generating a list of offsets from the file register read at the issue of the indirect stream instruction.

As shown in block 1640, the process includes generating a list of unrolled off-tile memory requests, where each unrolled request accesses a set of contiguous address in the off-tile memory. These requests are used to generate both the tile-local memory request and the off-tile memory requests. The tile-local stride, tile-local stream type, and the alignment are considered while unrolling the requests. The process further includes generating a list of partially unrolled requests, where each partially unrolled request accesses a set of contiguous addresses in the off-tile memory. These requests are further unrolled to generate a set of requests that are aligned to the granularity of the memory selected by the off-tile memory type.

As shown in block 1650, the process includes unrolling the stream descriptors into a set of off-tile memory requests and tile-local memory requests.

Figure 10:
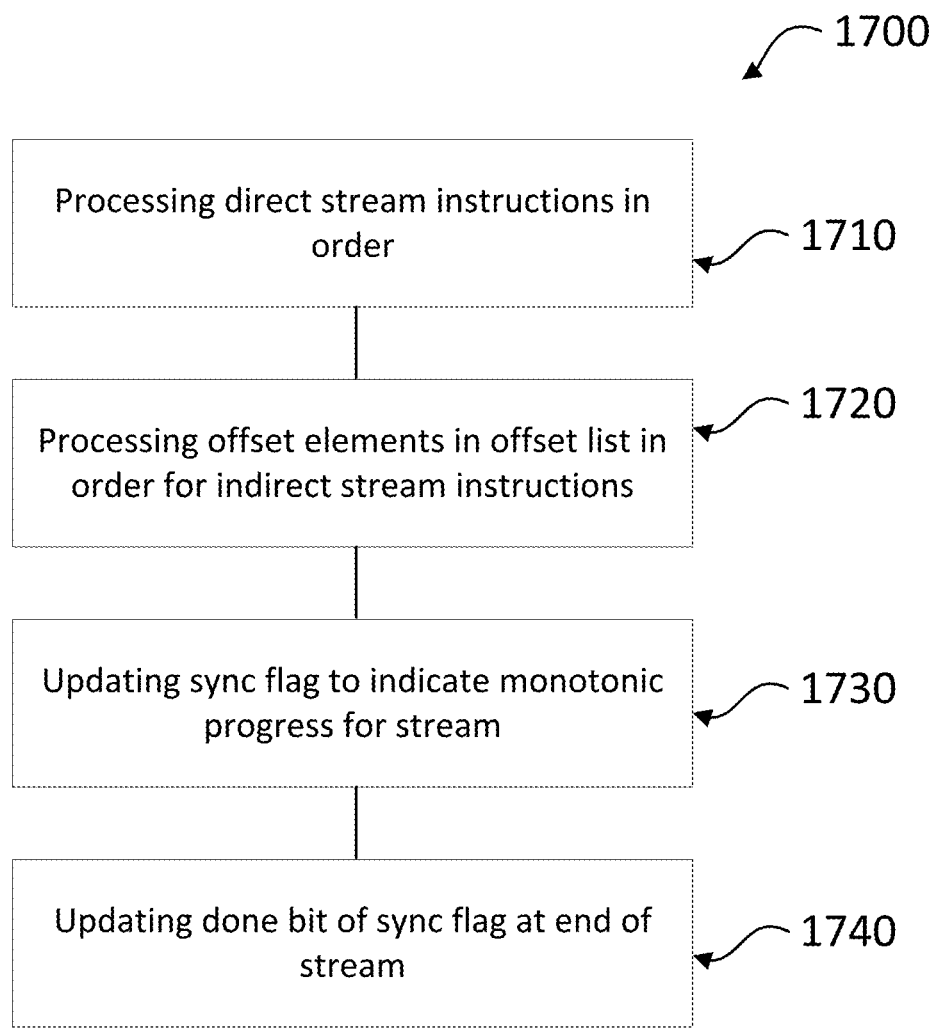
FIG. 10 is a flow diagram of an example process for ordering the stream transfers, according to aspects of the disclosure.

FIG. 10 is a flow diagram of an example process 1700 for ordering the stream transfers. The example process 1700 can be performed on a system of one or more processors in one or more locations. For example, the hardware circuit 101, as described above, can perform the process 1700. The discrete stream instructions that are issued by a core that have same stream ID form a single stream, but ordering may not be guaranteed across different streams. The scatter gather engine 1722 includes multiple threads that can process these requests in parallel. Ordering can be guaranteed for transfers within a single stream, which can span multiple stream instructions.

As shown in block 1710, the stream instructions that belong to a stream are processed in order. The requests corresponding to them will be issued in order by the scatter gather engine 322.

As shown in block 1720, in the case of indirect stream instructions, the offset list is ordered. The offset elements in the offset list are processed in order. The writes are issued in order to the destination memory, but the writes can be committed by the destination memory out of order. The reads are issued in order to the source memory, but the reads can be serviced by the source memory out of order.

As shown in block 1730, the scatter-gather engine 322 updates the sync flag 318 to indicate a monotonic incremental progress for the stream. If a tile local memory is the source, then the sync flag 318 tracks the reads from it. A sync flag value indicates the first of chunks of data that can be overwritten in the tile-local memory. If a tile local memory is the destination, then the sync flag 318 tracks the writes to it. A sync flag value here indicates the subsequent reads to the first chunks of data in the tile-local memory will return to the requested data.

As shown in block 1740, the done bit in the sync flag 318 can be updated at the end of the stream. This is indicated by the set done bit in the stream descriptor. The done bit can be set after all the data for the requests preceding and including the last stream descriptor is fully committed to memory. All reads have completed if the tile-local memory is the source and all writes have committed if the tile-local memory is the destination.

Figure 11:
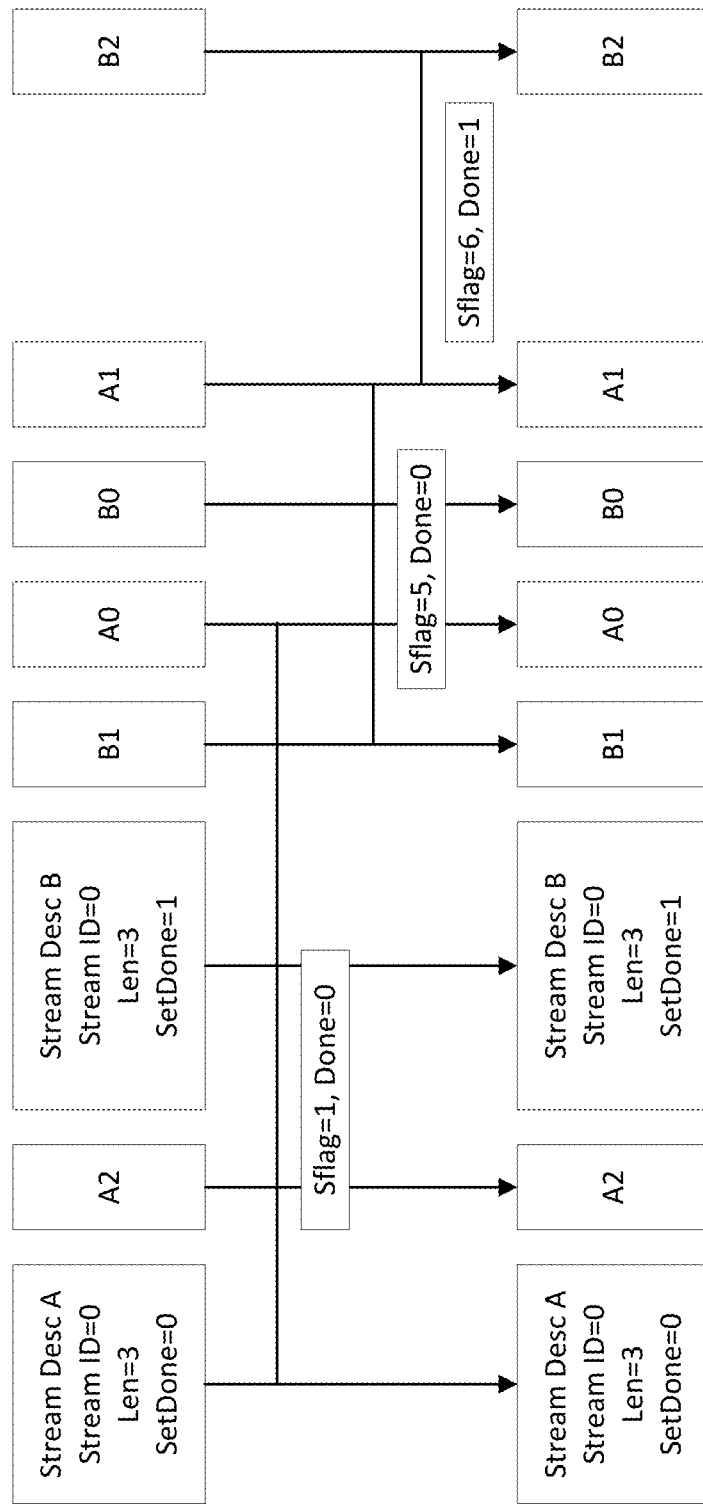
FIG. 11 is an example diagram of the stream ordering, according to aspects of the disclosure.

FIG. 11 is an example diagram of the stream ordering. Consider stream descriptors A and B to form a single stream. Stream descriptor B has a set done bit set. The partial progress of the stream is tracked by the sync flag. When A0 is committed to memory, either read or write, then the sync flag is updated to a value of 1. Even if A2 and B1 are committed before A0, the sync flag value is not updated to 3. When A1 is committed to memory, the 5 consecutive chunks of data in the stream, A0, A1, A2, B0, B1, are committed, which is indicated by a sync flag value of 5. The done bit is not set at this point as stream descriptor A is not the last in the stream. When B2 is committed, the sync flag value is set to 6. The done bit can now be set as all the data chunks of the stream are committed and the stream descriptor B is the end of the stream.

Cooperative Prefetching

Aspects of the disclosed technology provides an instruction prefetch pipeline architecture, which can be used by tiles of the sparse accelerator, which provides good performance without the complexity of a full cache coherent solution deployed in conventional CPUs.

Aspects of the disclosed technology provide methods and systems related to creating a prefetch pipeline around the SPMD aspect of a programming model to reduce the cold cache miss overheads. The prefetch responses from any core are broadcasted to all the cores in the sparse accelerator. These prefetch responses are committed to the core's local cache. This allows the other non-requesting cores to get bundles of instructions or data ahead of a time when cores will be available to process the instructions or data, completely avoiding missing process cycles. In addition, there can be prefetch request filtering on the arbitration path, which is a logical and/or hardware-based pathway to arbitrate between requests, leading to the task instruction memory, which boosts the task instruction memory bandwidth by avoiding redundant request fetches.

Task instruction memory can hold a set of programs that can be executed by the Tile Access Core (TAC) and Tile Execute Core (TEC). The program counter (PC) in each core is a physical offset into task instruction memory. The task instruction memory is a software managed memory that is exposed to the direct memory access system. Software can use direct memory access to populate the programs in the task instruction memory and use the appropriate program counter while issuing the tasks to the tiles. As tiles operate in single-program multiple-data mode, at any point of the execution of the sparse accelerator, statistically most of the tiles may be running the same program. These programs further may be composed of one or compact instruction loops. A compact instruction loop can refer to the size of the instructions in memory that is small enough to fit in tile memory. The programs themselves may be small in size, e.g., a few hundred instruction bundles, and the programs can have multiple branches that can diverge, either with branches within a loop or branches into other loops.

Figure 12:
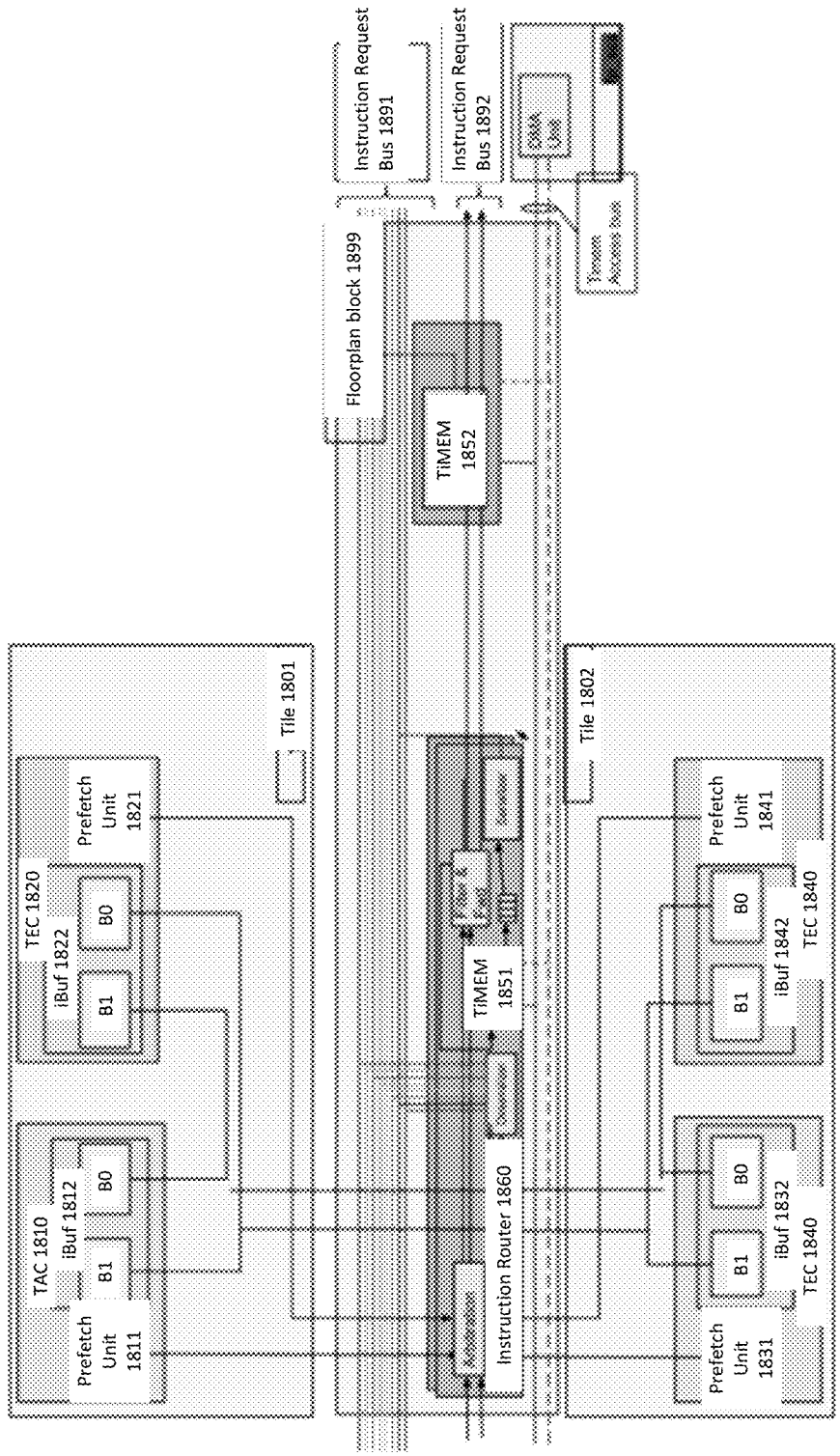
FIG. 12 illustrates a logical view of connectivity between tiles and of an example sparse accelerator, according to aspects of the disclosure.
Figure 13:
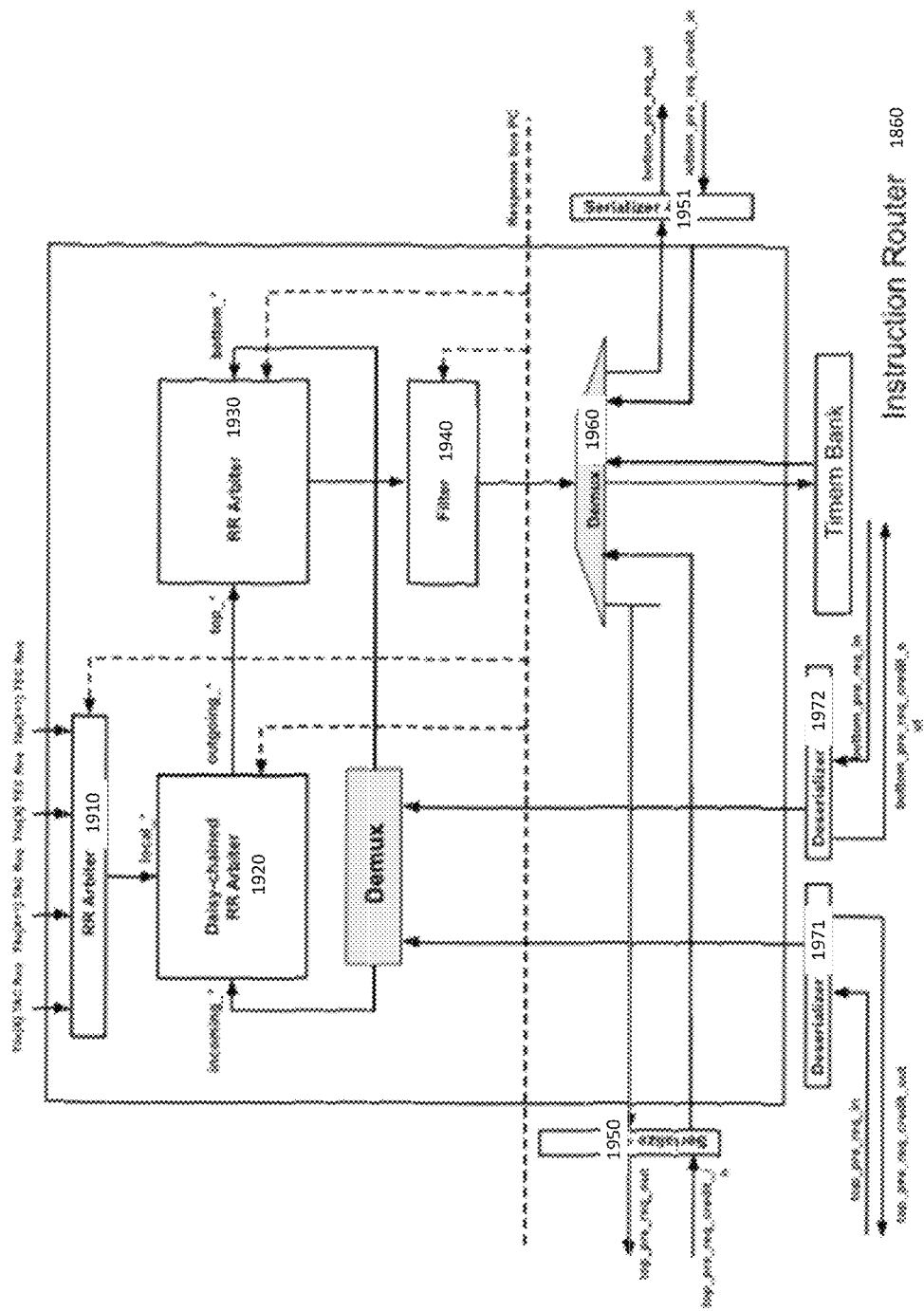
FIG. 13 illustrates additional exemplary aspects of an instruction router, according to aspects of the disclosure.

These and other potential characteristics can be exploited by an instruction pipeline as described herein with reference, for example, to FIGS. 12-13. When an instruction bundle is received by the sparse accelerator, the sparse accelerator is configured to broadcast the prefetch response for a received instruction to all of the tiles in the sparse accelerator. The prefetch responses are committed to the local cache of each core, allowing non-requesting tiles to get bundles ahead of time, completely avoiding misses. In addition, prefetch request filtering on the arbitration path leading to the task instruction memory can be implemented in some examples, boosting task instruction memory bandwidth by avoiding redundant request fetches.

FIG. 12 illustrates a logical view of connectivity between tiles 1901 and 1902 of an example sparse accelerator, according to aspects of the disclosed technology. For clarity, not every component, module, or software block with respect to FIG. 12 is labeled. Generally, and as will be apparent from the description below, through prefetching instructions, aggregating requests for instructions, filtering, and retaining instructions or references, to the memory location closest to a requesting processing unit, instructions can be more quickly provided to processing units or processing cores, increasing the efficiency of the system. Additional aspects of components related to FIG. 12 are further described below with respect to FIG. 13.

In broad overview FIG. 12 illustrates aspects of task instruction memory (Timem or Timem bank), instruction buffers ("iBuf"), prefetch units, and instruction routers. Illustrated in FIG. 12 is tile 1901, including tile access core (TAC) 1910 and tile execute core (TEC) 1920. TAC 1910 can contain a prefetch 1911 and iBuf 1912. Similarly, TEC can contain prefetch unit 1921 and iBuf 1922. Also illustrated in FIG. 12 is tile core 1902, which contains TAC 1930 and TEC 1940, respectively containing prefetch 1911 and iBuf 1932, and prefetch unit 1941 and iBuf 342.

Further illustrated in FIG. 12 are Timem 1951 and 1952 and instruction router 1960, which can be logically or physically contained within floorplan block 1999. Timem 1951 and 1952 can locally store instructions for quicker access by each tile core versus the tile core requesting the instructions from a location which is further downstream from the Timem. Also illustrated is an instruction broadcast bus, which can broadcast instruction bundles downstream to floorplan block 1999 and to Timem banks therein. Instruction request bus 1992 can aggregate requests for instructions from various components before requesting those instructions. Deserializer and serializer can deserialize or serialize instructions, for transmitting instructions along various buses, e.g., for being received from instruction broadcast bus 1991 or for serializing instructions being sent to instruction request bus 1992.

A prefetch unit, such as prefetch unit 1911 or prefetch unit 1912, corresponding to a core can make a read request to the Timem starting from a miss program counter (PC) (and the overlay/task ID) until the end of a prefetch window. A prefetch window is a time period which can be selectable by software with a register or other memory area. For example, the prefetch window can be defined in a prefetch depth variable. Prefetch read requests from other tiles can be forwarded by adjacent floorplan block 1999. These forwarded requests can be arbitrated with the prefetch requests made by the prefetch units in an adjacent tile core. For example, tile 1901 and tile 1902 may be adjacent to one another. In some examples, a pair of cores can be assigned to a single instruction request bus or a single instruction broadcast bus.

A number of prefetch instruction request banks can be present in a tile. In some examples, there can be one bus per Timem bank, which can be arbitrated independently from one another. Independent arbitration of the buses can allow for avoidance of head-of-line blocking across independent banks.

Requests that are sent from a prefetch window can be received at instruction router 1960. Instruction router 1960 can filter the selected requests to remove duplicates before forwarding to another instruction router or to the target Timem bank. Filtering can potentially increase the instruction request bandwidth if the cores are operating in an SPMD mode.

Instructions read from a Timem bank can be broadcasted to all the tiles on the instruction broadcast bus. For example, there can be as many instruction broadcast buses as Timem banks. In some examples, instructions can be sent as instruction bundles. Instruction groups are composed of instructions contained in bundles. A bundle can be a sequence of instructions that starts on an aligned "boundary." The instruction bundle can be serialized on a corresponding instruction broadcast bus over a fixed number of cycles of the processor or core. In some examples, such as during a "steady-state" operation of the system, the aggregate bandwidth of the instruction broadcast buses can be 2 bundles per cycle. In this manner, instruction broadcast bus 1992 is never backpressured.

The instructions received on the broadcast bus can be deserialized by the Instruction Router and one instruction is forwarded to each of the iBuf. At steady state, the system can be required to sustain up to 2 writes from the prefetch interface and 1 read from the instruction fetch interface. The prefetch processes the incoming instruction and decides if it should be committed to the ibuf or dropped.

FIG. 13 illustrates additional exemplary aspects of instruction router 1960. Illustrated in FIG. 13 is round robin (RR) arbiter 1910, daisy-chained round robin arbiter 1920, round robin arbitrary 1930, filter 1940, serializers 1950 and 1951, demultiplexers (demux) 1960, and deserializers 1971 and 1972. Other aspects and components are illustrated in FIG. 13 which are not labeled for simplicity.

Instruction Router 1960 may have an independent read request bus for each Timem bank in the system. The router 1960 may throttle the instruction bundles at the rate to match the bandwidth of the instruction broadcast bus before being forwarded to an adjacent instruction router. In the description below, it can be assumed that deserialization and serialization can be performed before a request is presented to instruction router 1960.

The instruction router 1960 arbitrates across can depend on the position of the cores relative to a Timem bank. Instruction router 1960 can be parameterized to select sources and destinations based on instances instruction router 1960 is arbitrating. Demultiplexer 1960 illustrated in FIG. 13 can be designed according to the number of timebanks or serializers it is in communication with.

Instruction router 1860 can arbitrate across the following example sources: a prefetch read forwarded by an Instruction Router upstream or above instruction router 1860; a prefetch read forwarded by Instruction Router downstream from instruction router 1860; and a prefetch reads originated by cores connected to instruction router 1860.

The demux (the select is a design parameter) selects the top_pre_req or bottom_pre_req to arbitrate with the request originating from the cores connected to the Instruction Router. This arbitration uses a Daisy-chained RR arbitration scheme. Daisy-Chained round robin arbiter 1920 can give a grant every "x" cycles to match the bandwidth of the instruction broadcast bus. A request waiting to be arbitrated can be dropped if the PC matches the PC seen on the instruction broadcast bus. This can be considered to be the first level of filtering.

The winner of the daisy chained arbitration can be processed differently based on the position of instruction router 1860 relative to a Timem bank. For instance, if Timem bank is below the Instruction Router, the winner of the daisy chain arbitration can be forwarded to instruction router at the "bottom" after passing through filter 1940. If Timem bank is above the instruction router 1860, the winner of the daisy chain arbitration is forwarded to instruction router 1860 at the top after passing through filter 1940.

If Timem bank is within instruction router 1860, the winner of the daisy chain arbitration undergoes one more level of arbitration with the request forwarded by the instruction router at the bottom. In this case, there can be two daisy-chained networks arbitrating to get to the Timem bank. Depending on the position of instruction router 1860, the chains may not be balanced. To ensure fair access is provided to the cores on either side of the chain, a modified RR arbiter can be used. Similar to the first level arbitration, any request that matches the PC on the broadcast bus will be dropped here. This can be considered to be a second level of filtering.

The overall winner from above is passed to the filter 440, which compares the incoming request against one of the other outstanding requests. The request is dropped if the request matches any of the outstanding requests. This can be considered to be the third level of filtering.

Further, programmability of this system can be ensured as the filtering at each point can be enabled/disabled with an individual programmable or software controllable switch. A Timem access bus can be a bus which connects the system to all the Timem banks, allowing them to read and write instruction bundles to the Timem banks. The Timem access bus can have 4 buses, a read request bus, a read response bus, a write request bus, and a write response bus, as further explained below.

The read request bus can be a daisy-chained bus that can run to the Timem banks. Each Timem bank can forward a request to an adjacent Timem bank if the request is not addressing it. If the request addresses the Timem bank, then it is serviced by the Timem bank.

The read response bus can be a daisy-chained bus that can transmit the instruction bundles read from the Timem bank. At each Timem bank there can be a round robin arbitration between the incoming instruction from an adjacent bank and the instruction bundle from the current bank. As the instruction bundles are serialized over "n" cycles, the bus grant is held for "n" cycles.

The write request bus can be a daisy-chained bus that can run to the Timem banks. The write requests can be serialized over 2 cycles for example. Each Timem bank forwards the flits to adjacent banks if the request is not addressing it. If a request addresses the Timem bank, then the request is deserialized by the bank before being written into the Timem bank.

The write response bus can be a daisy-chained bus that relays the write response from the Timem banks. At each Timem bank there is an arbitration between an incoming response and the response from the current bank. A simple round-robin arbitration can be used to allow one of the responses to be granted or provided.

The read and write requests can have a "q" bit tag to encode for a maximum of $2^q$ outstanding read and write requests, which are passed back in the responses by the banks and can be used by the overall system or a component providing instructions to identify a request corresponding to the responses.

If an endpoint is unable to accept a request or a response, the bus can "backpressure." When the bus is unable to transfer instructions or data it contains and a backlog to be sent through the bus builds up. In addition, the bus can be backpressured due to arbitration loss. This can be allowable in the overall system as the Timem accesses are generally low bandwidth accesses.

Tile Instruction Memory (Timem) can be shared by the tile cores described in FIG. 12.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

Computing Overview

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

Aspects of the present disclosure include methods, systems, and apparatuses using an instruction prefetch pipeline architecture that provides good performance without the complexity of a full cache coherent solution deployed in conventional CPUs.

Aspects of the disclosed technology relate to components which can be used to construct an instruction prefetch pipeline, including instruction memory (TiMem), instruction buffer (iBuf), a prefetch unit, and an instruction router Aspects of the present disclosure can relate to certain properties which can exist in conjunction with expected or known behavior of tiles of XPUs, such as for example: tiles can be expected to run in Single Program Multiple Data (SPMD) mode; at any given point of time statistically most of the tiles can be expected to be running the same program; programs can be composed of one or more compact loops; programs can small in size, such as a few hundred bundles; or programs can have multiple branches that can diverge. The disclosed technology can exploit these or related properties and has lower complexity than a full cache-based solution.

Aspects of the disclosed technology include a hardware circuit. The hardware circuit can include a plurality of tiles, each tile configured to operate in parallel with other tiles in the plurality of tiles, each tile of the plurality of tiles including a processing core, a prefetch unit; and an instruction buffer; a plurality of data processing lanes configured to stream respective data from an upstream input to a downstream destination, and a plurality of task instruction memories, each task instruction memory of the plurality of task instruction memories being arranged in a sequence and coupled to one or more tiles from the plurality of tiles via an instruction router. The task instruction memories can be arranged in a downstream sequence. Each tile can include a tile access core, and the prefetch unit contained within each tile can be contained within the tile access core. Each tile can include a tile execute core, and the prefetch unit contained within each tile can be contained within the tile execute core. The hardware circuit can include an instruction broadcast bus and an instruction request bus. The instruction broadcast bus can contain independent data lanes, wherein the number of independent data lanes can correspond to the number of task instruction memories.

The instruction request bus can contain independent data lanes, wherein the number of independent data lanes corresponds to the number of task instruction memories. Instructions received by a task instruction memory can be broadcasted to all the tiles linked on the instruction broadcast bus. The prefetch can be configured to make a request to at least one task instruction memory during a prefetch window. The prefetch window can be selectable or adjustable by software. The hardware circuit can further include an instruction router. The instruction router can include a round robin arbiter configured to arbitrate requests including a prefetch read request. The instruction buffer can store instructions for a tile access core, or a tile execute core. The hardware circuit can be configured as a single instruction multiple data processor. The hardware circuit can be configured as a multiple instructions multiple data processor. The hardware circuit can include a task instruction memory access bus. The task instruction memory access bus can include a read request bus, a read response bus, a write request bus, and a write response bus.

Aspects of the disclosed technology include a TPU. The TPU can include a hardware circuit and an instruction broadcast bus coupled to the hardware circuit, the instruction broadcast bus configured to push instructions to the hardware circuit. The hardware circuit can include a plurality of tiles and each tile can be configured to operate in parallel with other tiles in the plurality of tiles, and each tile of the plurality of tiles can include a processing core; a prefetch unit; and an instruction buffer; a plurality of data processing lanes configured to stream respective data from an upstream input to a downstream destination; and a plurality of task instruction memories, each task instruction memory of the plurality of task instruction memories being arranged in a sequence and coupled to one or more tiles from the plurality of tiles via an instruction router. The TPU can further including an instruction request bus coupled to the hardware circuit and the instruction request bus can be configured to receive requests for instructions.

Aspects of the disclosed technology includes a method for prefetching or providing instructions by a single instruction multiple data (SIMD) processing unit. The method can include receiving from a plurality of tiles of the SIMD processing unit requests for instructions; filtering the requests for instructions to de-duplicate requests for identical instructions to generate a first set of requests; generating a set of instructions responsive to the first set of requests; providing from a computing unit to a task instruction memory of the SIMD processing unit a set of instructions; storing at the task instruction memory the set of instructions; and accessing by a prefetch unit via an instruction router an instruction from the set of instructions. The SIMD processing unit can include a plurality of tiles, each tile configured to operate in parallel with other tiles in the plurality of tiles, each tile of the plurality of tiles including: a processing core; the prefetch unit; and the instruction buffer. Receiving can occur in a first processing clock cycle and the providing occurs in a second processing clock cycle. The first processing clock cycle can occur prior to the second processing clock cycle.

Generally disclosed herein is a hardware/software interface for asynchronous data movement between an off-core memory and a core-local memory, referred to as "stream transfers", and a stream ordering model. The stream transfers allow software to more efficiently express common data-movement patterns, specifically ones seen in sparse workloads. Stream instructions that belong to a stream are processed in order. For indirect stream instructions, offset elements in an offset list are processed in order. A sync flag is updated to indicate monotonic incremental progress for the stream.

An aspect of the disclosure provides for a method including identifying, with one or more processors, progress of data being transferred between an off-core memory and a core-local memory; identifying, with one or more processors, reads from a core-local memory when the core-local memory is a source of data, wherein reads are issued in-order to the source and serviced by the source out-of-order; identifying, with the one or more processors, writes to the core-local memory when the core-local memory is a destination for the data, wherein writes are issued in-order to the destination and committed by the destination out-of-order; and accessing, with the one or more processors, off-core memory based on indirect scatter/gather memory accesses for reads from the off-core memory when the off-core memory is the source of the data and writes to the off-core memory when the off-core memory is the destination for the data.

In an example, identifying the progress of data being transferred further includes using a core-local synchronization flag. In another example, the method further includes selecting, with the one or more processors, memory accesses to barrier based on scalar fence instructions. In yet another example, accessing the off-core memory based on indirect scatter/gather memory accesses further includes sourcing indirect addresses from a register file or from the core-local memory. In yet another example, the method further includes circular buffering, with the one or more processors, in the core-local memory.

In yet another example, the method further includes updating, with the one or more processors, a core-local synchronization flag to indicate monotonic incremental progress for the data transfer. In yet another example, the method further includes ending, with the one or more processors, the data transfer when all the reads from the core-local memory have issued. In yet another example, the method further includes ending, with the one or more processors, the data transfer when all writes to the core-local memory have committed.

Another aspect of the disclosure provides for a system including one or more processors; and one or more storage devices coupled to the one or more processors and storing instructions that, when executed by the one or more processors, causes the one or more processors to perform operations for transferring data between an off-core memory and a core-local memory. The operations include identifying progress of data being transferred between the off-core memory and the core-local memory; identifying reads from the core-local memory when the core-local memory is a source of the data, wherein reads are issued in-order to the source and serviced by the source out-of-order; identifying writes to the core-local memory when the core-local memory is a destination for the data, wherein writes are issued in-order to the destination and committed by the destination out-of-order; and accessing the off-core memory based on indirect scatter/gather memory accesses for reads from the off-core memory when the off-core memory is the source of the data and writes to the off-core memory when the off-core memory is the destination for the data.

In an example, identifying the progress of data being transferred further includes using a core-local synchronization flag. In another example, the operations further include selecting memory accesses to barrier based on scalar fence instructions. In yet another example, accessing the off-core memory based on indirect scatter/gather memory accesses further includes sourcing indirect addresses from a register file or from the core-local memory. In yet another example, the operations further include circular buffering in the core-local memory.

In yet another example, the operations further include updating a core-local synchronization flag to indicate monotonic incremental progress for the data transfer. In yet another example, the operations further include ending the data transfer when all the reads from the core-local memory have issued. In yet another example, the operations further include ending the data transfer when all writes to the core-local memory have committed.

Yet another aspect of the disclosure provides for a non-transitory computer readable storage medium for storing instructions that, when executed by one or more processors, causes the one or more processors to perform operations for transferring data between the off-core memory and the core-local memory. The operations include identifying progress of data being transferred between the off-core memory and the core-local memory; identifying reads from the core-local memory when the core-local memory is a source of the data, wherein reads are issued in-order to the source and serviced by the source out-of-order; identifying writes to the core-local memory when the core-local memory is a destination for the data, wherein writes are issued in-order to the destination and committed by the destination out-of-order; and accessing the off-core memory based on indirect scatter/gather memory accesses for reads from the off-core memory when the off-core memory is the source of the data and writes to the off-core memory when the off-core memory is the destination for the data.

In an example, accessing the off-core memory based on indirect scatter/gather memory accesses further includes sourcing indirect addresses from a register file or from the core-local memory. In another example, the operations further include circular buffering in the core-local memory. In yet another example, the operations further include updating the synchronization flag to indicate monotonic incremental progress for the data transfer.

Aspects of the disclosure are directed to a cross-lane processing unit (XPU) for performing single instruction, multiple data (SIMD) data-dependent operations across multiple data processing lanes of a processor. Rather than physically fabricating operation-specific circuits for each data-dependent operation, the XPU can be configured to perform different operations in response to input signals configuring the processing cells to perform individual operations and crossbars arranged as a stacked network in the XPU. Each processing cell can receive and process data across multiple data processing lanes. Aspects of the disclosure include configuring the XPU to perform vector sorting, while also computing a duplicate count of duplicate elements in received input vectors for sorting, eliminating the need to configure the XPU separately for sorting and duplicate counting. The XPU can be implemented as part of a hardware circuit, complementing computation of dense data structures, such as dense matrices, with accelerated processing of sparse data structures, such as sparse vectors or matrices.

Aspects of the disclosure include a hardware circuit, including: a plurality of stages, each stage including a crossbar and two or more cells; a plurality of data processing lanes streaming respective data from an upstream input to a downstream destination, through a plurality of cells and plurality of crossbars of the plurality of stages; wherein the hardware circuit is configured to: receive input data from the upstream input along the plurality of data processing lanes, and a first instruction for performing a first operation; in response to receiving the first instruction, for each stage: send a respective second instruction to respective processing cells of the stage, each cell configured to perform a respective second operation in response to receiving an input from a respective data processing lane, and send a respective third instruction to a respective crossbar for the stage, wherein the crossbar is configured to permute output from each cell of the stage to cells of a next stage along the plurality of data processing lanes; and perform the first operation by processing the received input data along the plurality of data processing lanes and the plurality of cells configured to perform respective second operations.

Aspects of the disclosure include a system including: a hardware circuit including a plurality of stages, each stage including a crossbar and two or more cells, and a plurality of data processing lanes streaming respective data from an upstream input to a downstream destination, through a plurality of cells and plurality of crossbars of the plurality of stages; wherein the hardware circuit is configured to: receive input data from the upstream input along the plurality of data processing lanes, and a first instruction for performing a first operation; in response to receiving the first instruction, for each stage: send a respective second instruction to respective processing cells of the stage, each cell configured to perform a respective second operation in response to receiving an input from a respective data processing lane, and send a respective third instruction to a respective crossbar for the stage, wherein the crossbar is configured to permute output from each cell of the stage to cells of a next stage along the plurality of data processing lanes; and perform the first operation by processing the received input data along the plurality of data processing lanes and the plurality of cells configured to perform respective second operations.

Aspects of the disclosure include a computer-implemented method, including: receiving, by a hardware circuit including a plurality of stages, each stage including a crossbar and two or more cells and a plurality of data processing lanes streaming respective data from an upstream input to a downstream destination, through a plurality of cells and plurality of crossbars of the plurality of stages, input data from the upstream input along the plurality of data processing lanes, and a first instruction for performing a first operation; in response to receiving the first instruction, for each stage: sending, by the hardware circuit, a respective second instruction to respective processing cells of the stage, each cell configured to perform a respective second operation in response to receiving an input from a respective data processing lane, and sending, by the hardware circuit, a respective third instruction to a respective crossbar for the stage, wherein the crossbar is configured to permute output from each cell of the stage to cells of a next stage along the plurality of data processing lanes; and performing, by the hardware circuit, the first operation by processing the received input data along the plurality of data processing lanes and the plurality of cells configured to perform respective second operations.

Aspects of the disclosure can include one or more of the following features. In some examples, aspects of the disclosure include all of the following features, in combination.

Each cell is configured to receive a respective first input operand from a respective data processing lane passing through the cell, and a respective second input operand from a respective crossbar of a stage upstream to the cell.

The downstream destination of data of the plurality of data processing lanes is a vector processing unit, the vector processing unit configured to perform single instruction, multiple data vector operations on output data of the hardware circuit.

Each of the cells are configured to perform one or more of a plurality of predetermined primitive operations in response to one or more received instructions; wherein the hardware circuit further includes a plurality of control cells, and wherein in sending the respective second instruction to the respective processing cells, the hardware circuit is configured to generate and send, by each control cell, a respective control signal to each processing cell based on the first operation specified by the first instruction.

In generating and sending, by each control cell, the respective control signal, the hardware circuit is configured to generate a respective control signal for causing each processing cell to perform one of a respective arithmetic, comparison, and bypass operation, based on at least one of the stage the processing cell is in and the data processing lane passing through the processing cell.

The plurality of cells and plurality of crossbars form a processing network of connected cells across the plurality of stages and plurality of data processing lanes, the processing network of connected cells configured to receive the input data and to generate respective output data in accordance with performing the first operation on the input data.

The processing network of connected cells is configured to perform a combined vector sort and duplicate count operation, the combined operation including receiving, by the processing network, an input vector of elements; and generating, by the processing network and as output, a sorted output vector and data specifying counts of duplicate elements in the input vector. The input data includes sparse vector data, and wherein, after sending the respective second and third instructions, the hardware circuit is configured to perform one of a vector scans, vector summation, vector sort, or a vector duplicate count.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A processor, comprising:
a plurality of tiles, each of the plurality of tiles comprising:
a vector core configured to generate data-dependent address streams; and
a slice of a shared software-controlled scratchpad memory;
a scalar core configured to dispatch tasks to the plurality of tiles; and
a memory coupled to the plurality of tiles and the scalar core.

2. The processor of claim 1, wherein each tile is configured to execute independent computations.

3. The processor of claim 1, wherein the vector core in each of the plurality of tiles comprises a plurality of single instruction, multiple data (SIMD) processing lanes.

4. The processor of claim 1, wherein multiple tiles of the plurality of tiles issue memory requests in parallel to the main memory.

5. The processor of claim 1, wherein the data-dependent address streams are for any level of memory hierarchy.

6. The processor of claim 1, wherein each data-dependent address stream corresponds to a sequence of addresses, wherein length and specific values of the addresses in the sequence are data-dependent and known only at runtime.

7. The processor of claim 1, wherein the vector core in each of the plurality of tiles is configured to express the data-dependent address streams while decoupling performant servicing of the data-dependent address streams to microarchitecture.

8. The processor of claim 7, wherein the microarchitecture comprises a scatter-gather engine for the performant servicing of the data-dependent address streams.

9. The processor of claim 7, wherein the data-dependent address streams comprise indirect memory access with multiple addressing modes, runtime-configurable transfer size, and atomic arithmetic updates.

10. The processor of claim 1, wherein the vector core in each of the plurality of tiles comprises circular buffer instructions that enable transfer and access of dynamically-sized data streams on statically-sized regions of memory.

11. The processor of claim 10, further comprising microarchitecture configured to track a runtime buffer size of the dynamically-sized data streams.

12. The processors of claim 11, wherein the vector core in each of the plurality of tiles is configured to provide runtime-configuring and accessing regions of tile-local scratchpad memory as in-order circular first-in-first-out (FIFO) accesses without precluding out of order accesses to the same region of the tile-local scratchpad memory.

13. The processors of claim 12, wherein the in-order circular FIFO accesses, in association with the microarchitecture, enable the dynamically-sized data streams on statically-sized regions of the tile-local scratchpad memory.

14. The processor of claim 1, wherein each tile comprises a scatter-gather engine configured to manage issuing, fetching, tracking, and ordering of data streams.

15. The processor of claim 14, wherein each scatter-gather engine is further configured to maintain at least 256 outstanding read requests in flight per tile.

16. The processor of claim 14, wherein each scatter-gather engine is further configured to track and update a buffer occupancy to manage flow control.

17. The processor of claim 1, wherein a subset of the plurality of tiles each further comprise a prefetch unit configured to cooperatively prefetch data stream instructions.

18. The processor of claim 1, further comprising a cross-lane unit configured to accelerate at least one of irregular control flow sequences or intra-vector dependent operations.

19. The processor of claim 1, wherein each tile is configured to support scatters from off-chip memories to its scratchpad memory and gathers from its scratchpad memory to off-chip memories.

20. The processor of claim 1, wherein subsets of the plurality of tiles are grouped based on logically configurable vector widths.

21. The processor of claim 20, wherein the logically configurable vector widths comprise a logical SIMD width.

22. The processor of claim 1, wherein the processor is part of a machine learning accelerator configured to execute neural network layers exhibiting semantic sparsity.

23. The processor of claim 22, wherein the neural network layers comprise embedding or graph neural networks.

24. The processor of claim 22, wherein the processor is connected to a number of other processors over a network configured to perform distributed scatter-gather and computation required by neural network layer computations that are dynamic, irregular, and memory-bound.

25. A processor comprising:
- a plurality of tiles, each of the plurality of tiles comprising:
  - a vector core comprising circular buffer instructions configured to enable access of dynamically-sized data streams on statically-sized regions of memory; and
  - a slice of a shared software-controlled scratchpad memory;
- a scalar core configured to dispatch tasks to the plurality of tiles; and
- a memory coupled to the plurality of tiles and the scalar core.

26. A machine learning accelerator configured to execute neural network layers exhibiting semantic sparsity, the accelerator comprising:
- a plurality of tiles, each of the plurality of tiles comprising:
  - a vector core; and
  - a slice of a shared software-controlled scratchpad memory;
- a scalar core configured to dispatch tasks to the plurality of tiles; and
- a memory coupled to the plurality of tiles and the scalar core.

* * * * *